(12) United States Patent
Yoshida et al.

(10) Patent No.: US 12,386,356 B2
(45) Date of Patent: Aug. 12, 2025

(54) MOVING BODY CONTROL SYSTEM, CONTROL APPARATUS, AND MOVING BODY CONTROL METHOD

(71) Applicant: NEC Corporation, Tokyo (JP)

(72) Inventors: Hiroshi Yoshida, Tokyo (JP); Natsuhiko Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 282 days.

(21) Appl. No.: 18/020,538

(22) PCT Filed: Jun. 3, 2021

(86) PCT No.: PCT/JP2021/021115
§ 371 (c)(1),
(2) Date: Feb. 9, 2023

(87) PCT Pub. No.: WO2022/044473
PCT Pub. Date: Mar. 3, 2022

(65) Prior Publication Data
US 2023/0297121 A1 Sep. 21, 2023

(30) Foreign Application Priority Data
Aug. 25, 2020 (JP) .................. 2020-142065

(51) Int. Cl.
*G05D 1/00* (2024.01)
(52) U.S. Cl.
CPC .................. *G05D 1/0274* (2013.01)
(58) Field of Classification Search
CPC .. G05D 1/0274; G05D 1/0212; G05D 1/0251; G05D 1/0282
See application file for complete search history.

(56) References Cited

U.S. PATENT DOCUMENTS 6,134,486 A 10/2000 Kanayama
2015/0274158 A1* 10/2015 Fujita .................. B62D 15/025
701/23
(Continued)

FOREIGN PATENT DOCUMENTS

JP S61-112215 A 5/1986
JP H05-257529 A 10/1993
(Continued)

OTHER PUBLICATIONS

English Translation JP2002132344A. (Year: 2025).*
(Continued)

*Primary Examiner* — Rami Khatib
(74) *Attorney, Agent, or Firm* — Sughrue Mion, PLLC

(57) ABSTRACT

In order to provide a moving body control system, a control apparatus, and a moving body control method that can control a moving body to travel on a path appropriate for the moving body to return to a target line, the moving body control system includes a moving body and a control apparatus configured to control the moving body to follow a target path. The control apparatus is configured to determine a path to return to a target line, including a turning path by a turning radius of the moving body, based on the turning radius of the moving body, a distance between the moving body and the target line, and an angle between a moving direction of the moving body and the target line and to control the moving body to travel on the path.

14 Claims, 33 Drawing Sheets

(56) References Cited

U.S. PATENT DOCUMENTS

| | | | |
|---|---|---|---|
| 2018/0359907 A1* | 12/2018 | Kelley | G05D 1/0219 |
| 2022/0147047 A1* | 5/2022 | Liu | G05D 1/0223 |
| 2023/0348247 A1* | 11/2023 | Takao | G05D 1/0274 |

FOREIGN PATENT DOCUMENTS

| | | |
|---|---|---|
| JP | H11-327641 A | 11/1999 |
| JP | 2002-132344 A | 5/2002 |
| JP | 2014-219782 A | 11/2014 |
| JP | 2015-055906 A | 3/2015 |

OTHER PUBLICATIONS

JP Office Action for JP Application No. 2022-545326, mailed on Feb. 27, 2024 with English Translation.
International Search Report for PCT Application No. PCT/JP2021/021115, mailed on Aug. 10, 2021.
Written opinion for PCT Application No. PCT/JP2021/021115, mailed on Aug. 10, 2021.
English translation of Written opinion for PCT Application No. PCT/JP2021/021115, mailed on Aug. 10, 2021.

\* cited by examiner

**PLEASE ENTER
DETAILS OF GOODS TO TRANSPORT**

TRANSPORT TARGET GOODS : | GOODS A

TRANSPORT SOURCE : | AREA A

TRANSPORT DESTINATION :
| SELECT TRANSPORT DESTINATION |
| AREA B |
| AREA C |
| AREA D |
| AREA E |

Fig.8

TRAVEL CONTROL RESULT

Fig. 23 TRAVEL CONTROL RESULT

Fig.24 TRAVEL CONTROL RESULT

Fig.25 TRAVEL CONTROL RESULT

Fig.26 TRAVEL CONTROL RESULT

Fig.27 TRAVEL CONTROL RESULT

TRAVEL CONTROL RESULT

Fig.29 TRAVEL CONTROL RESULT

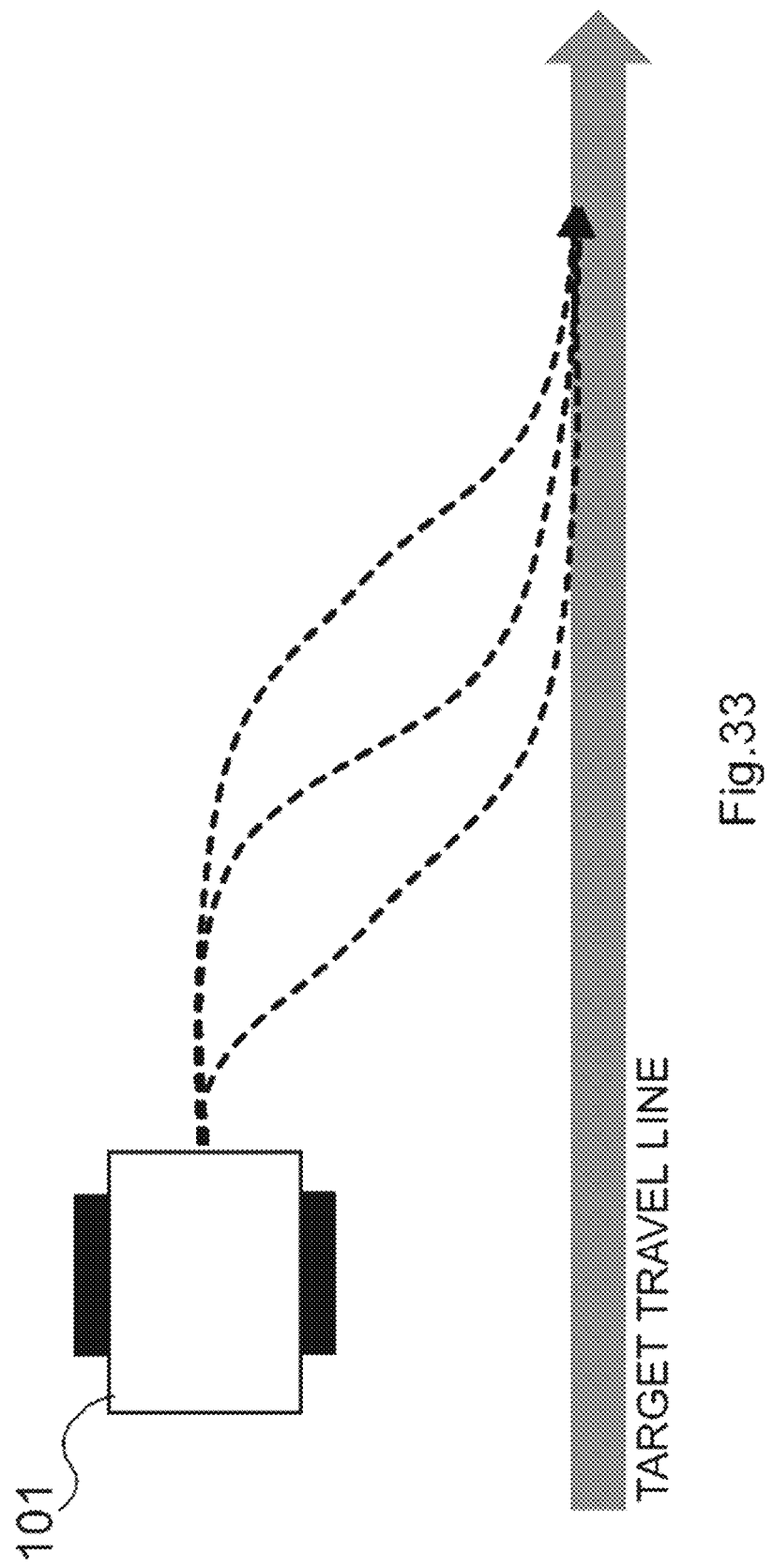

MOVING BODY CONTROL SYSTEM, CONTROL APPARATUS, AND MOVING BODY CONTROL METHOD

This application is a National Stage Entry of PCT/JP2021/021115 filed on Jun. 3, 2021, which claims priority from Japanese Patent Application 2020-142065 filed on Aug. 25, 2020, the contents of all of which are incorporated herein by reference, in their entirety.

TECHNICAL FIELD

The present invention relates to a moving body control system, a control apparatus, and a moving body control method.

BACKGROUND ART

In production sites such as a factory, transport of goods such as parts and materials to be used is inevitable. Also in distribution warehouses, transport of goods is necessary. For such transport of goods, transport robots (automated guided vehicles (AGVs)) are utilized.

PTL 1 discloses a technique related to turning control of an unmanned vehicle.

PTL 2 discloses that a travel body is controlled by remote control in which coordinates of and an azimuth angle to a target position are detected and the travel body is guided in a course to the target location thus detected, by using a pattern including turning and straight movement.

PTL 3 discloses a technique for tracking a path with a directed straight line and a directed curve by a robot moving vehicle.

CITATION LIST

Patent Literature

[PTL 1] JP 61-112215 A
[PTL 2] JP 05-257529 A
[PTL 3] JP 11-327641 A

SUMMARY

Technical Problem

Such a transport robot as that described above is controlled to travel to follow a target travel line (also referred to as a target line below). However, the transport robot sometimes deviates from a target line due to an error of travel control and the like. The transport robot that has deviated from the target line is controlled to return to the target line. However, a path appropriate for returning to the target line is not made clear.

FIG. 33 is a view of a transport robot 101 viewed from above in a state of having deviated from a target line. As illustrated by broken lines, a plurality of paths are conceivable for the transport robot 101 to return to the target line. However, which path is the shortest path for the transport robot 101 is not made clear.

Such a problem may be present not only for a transport robot configured to transport goods but also for a general moving body configured to follow a target line. And this problem cannot be solved even when the techniques disclosed in PTLs 1 to 3 are applied.

According to example aspects of the present invention, provided are a moving body control system, a control apparatus, and a moving body control method that can control a moving body to travel on a path appropriate for the moving body to return to a target line. Note that, according to the present invention, instead of or together with the above effects, other effects may be exerted.

Solution to Problem

According to one example aspect of the present invention, a moving body control system including: a moving body; and a control apparatus configured to control the moving body to follow a target line, wherein, the control apparatus is configured to: determine a path to return to the target line, including a turning path by a turning radius of the moving body, based on the turning radius of the moving body, a distance between the moving body and the target line, and an angle between a moving direction of the moving body and the target line; and control the moving body to travel on the path.

According to one example aspect of the present invention, a control apparatus including: a determination means configured to determine a path to return to a target line, including a turning path by a turning radius of a moving body controlled to follow the target line, based on the turning radius of the moving body, a distance between the moving body and the target line, and an angle between a moving direction of the moving body and the target line; and a control means configured to control the moving body to travel on the path.

According to one example aspect of the present invention, a moving body control method including: a determination step of determining a path to return to a target line, including a turning path by a turning radius of a moving body controlled to follow the target line, based on the turning radius of the moving body, a distance between the moving body and the target line, and an angle between a moving direction of the moving body and the target line; and a control step of controlling the moving body to travel on the path.

Advantageous Effects of Invention

According to one example aspects of the present invention, a moving body control system, a control apparatus, and a moving body control method that can control the moving body to travel on the path appropriate for the moving body to return to the target line. Note that, according to the present invention, instead of or together with the above effects, other effects may be exerted.

BRIEF DESCRIPTION OF THE DRAWINGS

FIG. 8 is a diagram illustrating an example of a display screen of the transport planning apparatus according to the first example embodiment;

FIG. 33 is a diagram for describing an issue.

DESCRIPTION OF THE EXAMPLE EMBODIMENTS

Example embodiments of the present invention will be described below in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Example Embodiments
2. First Example Embodiment
   2.1. System Configuration
   2.2. Operation Example
3. Second Example Embodiment
   3.1. System Configuration
   3.2. Operation Example

1. OVERVIEW OF EXAMPLE EMBODIMENTS

First, an overview of example embodiments will be described.

Figure 1:
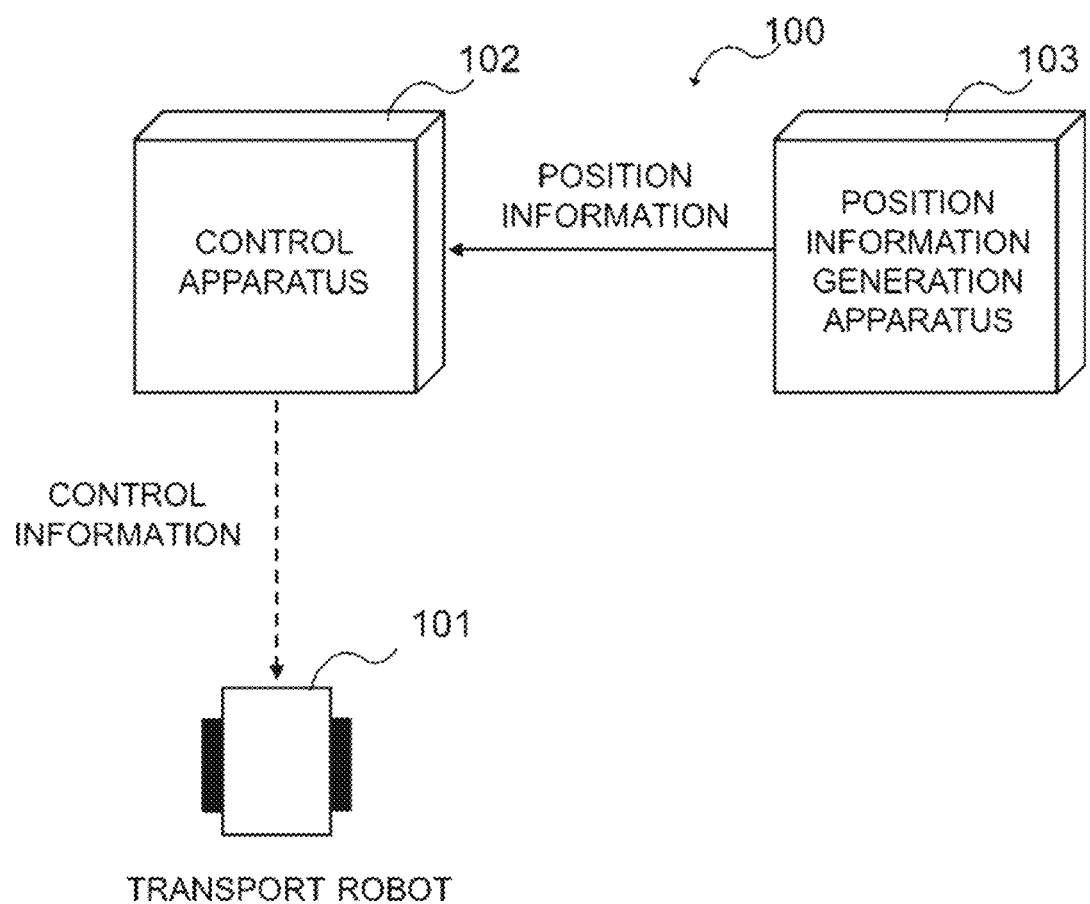
FIG. 1 is a diagram illustrating an example of a configuration of a transport system according to an example embodiment.

FIG. 1 is a diagram illustrating an example of a configuration of a transport system according to an example embodiment. A transport system 100 according to an example embodiment includes a transport robot 101, a control apparatus 102, and a position information generation apparatus 103. The transport robot 101 transports goods. The position information generation apparatus 103 generates position information of the transport robot 101 and transmits the generated position information to the control apparatus 102. The control apparatus 102 generates control information for transporting the goods by the transport robot 101, based on the position information of the transport robot 101, and transmits the generated control information to the transport robot 101. Note that the transport system 100 may include a plurality of transport robots. In this case, the position information generation apparatus 103 generates position information of each of the plurality of transport robots. The control apparatus 102 transmits control information for transporting the goods to each of the plurality of transport robots.

Figure 2:
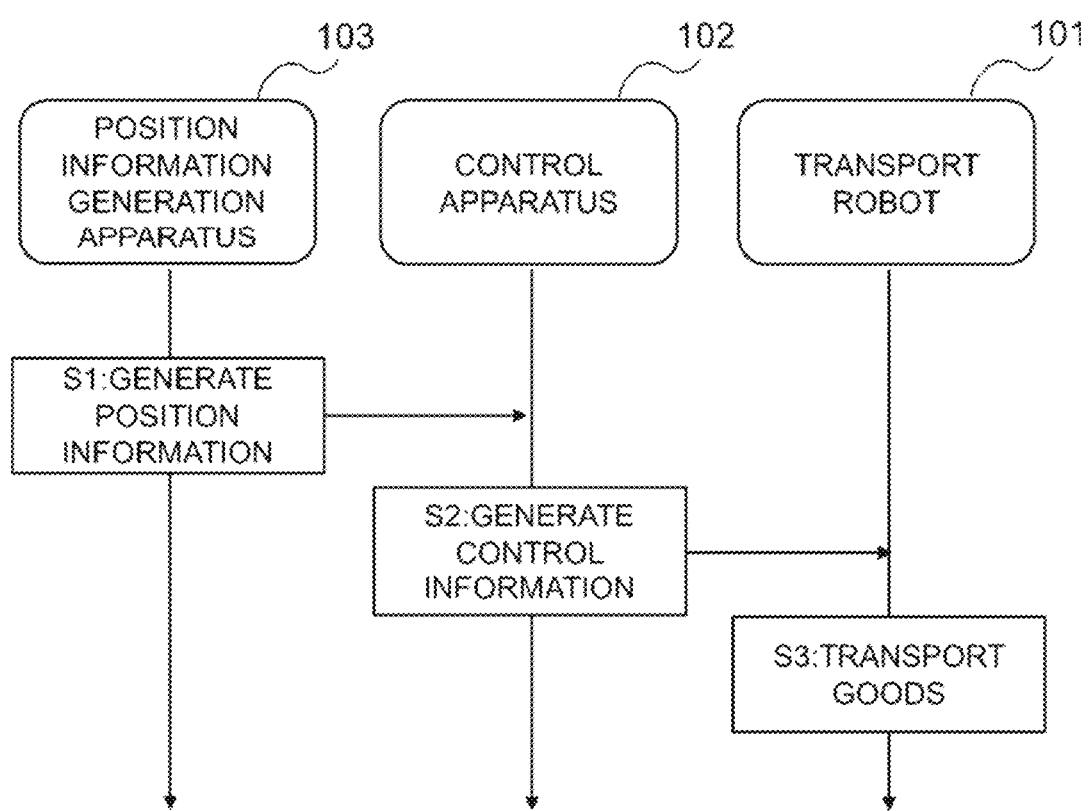
FIG. 2 is a sequence diagram illustrating an example of operation of the transport system according to the example embodiment.

FIG. 2 is a sequence diagram illustrating an example of operation of the transport system according to the example embodiment.

First, in step S1, the position information generation apparatus 103 generates position information of the transport robot 101 and transmits the generated position information to the control apparatus 102. Then, in step S2, the control apparatus 102 generates control information for transporting the goods by the transport robot 101, based on the position information, and transmits the generated control information to the transport robot 101. Then, in step S3, the transport robot 101 transports the goods, based on the received control information.

In the transport system 100, the transport robot 101 may be a type of robot configured to place goods on the robot itself or a type of robot configured to pull goods with a pulling instrument. Alternatively, two transport robots may move (transport) goods in cooperation. This allows the transport system 100 to adapt to various goods carried into a distribution warehouse or the like. For example, by the two transport robots sandwiching therebetween and moving goods, the two transport robots can transport the goods irrespective of the shape and the like of the goods. The control apparatus 102 can control the transport robots in consideration of the peripheral environment and the like as well as the situation of the two transport robots. Hence, for example, even when an obstacle is present near the transport robots (in the path of the transport robots), the control apparatus 102 can perform such control as to avoid the obstacle.

In the transport system 100, the transport robot 101 may be a type of transport robot configured to move by relying on a magnetic tape or a QR code (registered trademark) in a factory or the like in which the magnetic tape or the other is attached on a floor.

Figure 3:
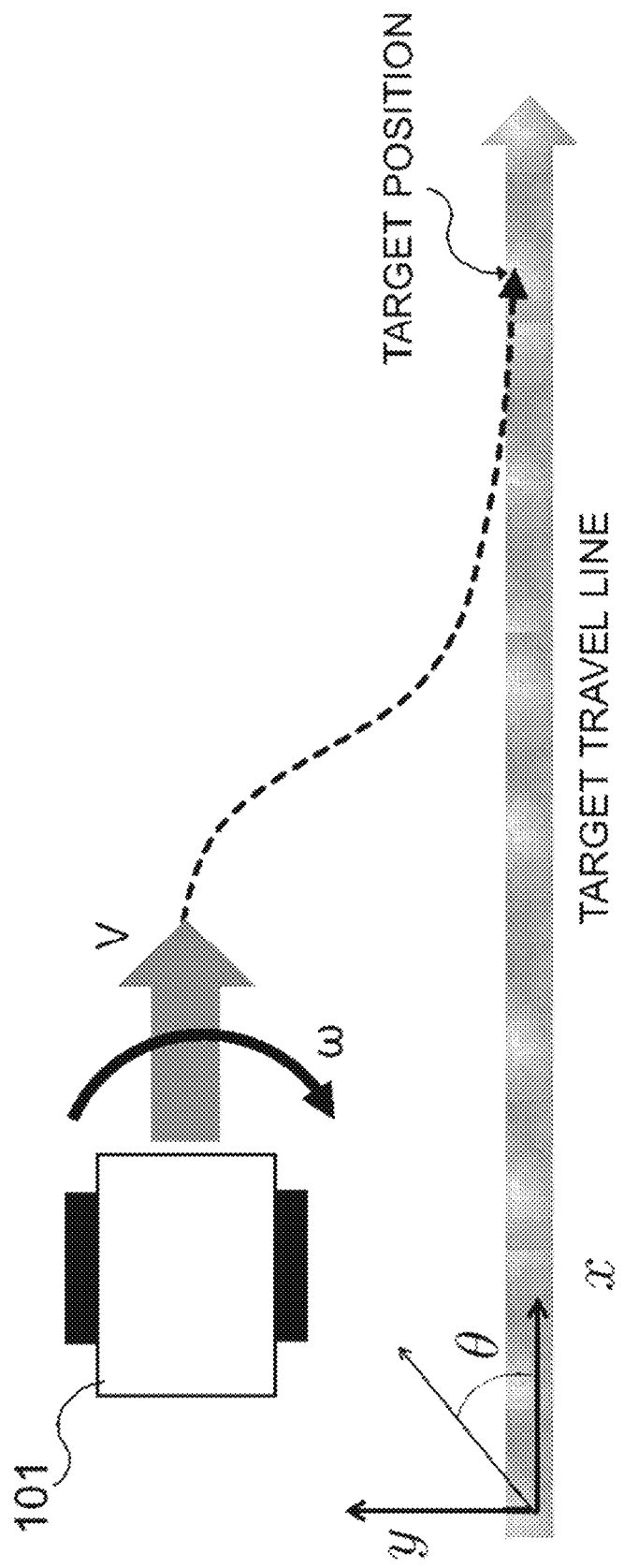
FIG. 3 is a diagram for describing control of the transport robot according to an example embodiment.

FIG. 3 is a diagram for describing control of the transport robot 101 according to an example embodiment. In FIG. 3 the transport robot 101 in a state of having deviated from a target travel line (target line) is viewed from above. Although the target travel line is illustrated as a straight line, the target travel line is not limited to a straight line.

In the present example embodiment, a path length for the transport robot 101 to return to the target travel line (illustrated in a broken line) is minimized under certain conditions. Specifically, the path length (way) from an initial position $(x_0, y_0, \theta_0)$ to a target position $(x_a, 0, 0)$ on the target travel line (X axis) is minimized. $x_a$ is any value.

The certain conditions are as follows.

The transport robot 101 is a one-shaft two-wheel moving robot.

A center-of-gravity velocity V [m/s] is fixed (constant).

The travel track is controlled using an angle velocity w [rad/s].

The transport robot 101 turns to right beside ($\theta$=0) on the X axis.

Since the center-of-gravity velocity V of the transport robot 101 is fixed, minimizing the path length corresponds to minimizing a travel time to the target position.

Assume that the position of the transport robot 101 is expressed as $(x, y, \theta)$, the center-of-gravity velocity V can be expressed by Expression (1) below.

[Math. 1]

$$V = \sqrt{\left(\frac{dx}{dt}\right)^2 + \left(\frac{dy}{dt}\right)^2} = \text{const.} \qquad (1)$$

Note that, in the present example embodiment, the center-of-gravity velocity V is fixed as a constant velocity.

The angle velocity $\omega$ is expressed as Expression (2) below and is limited by a maximum angle velocity $\omega_{max}$ as expressed in Expression (3) below. Note that the limitation of the angle velocity is attributable to the performance of a motor driving the wheels of the transport robot 101 and the like, for example.

[Math. 2]

$$\omega = \frac{d\theta}{dt} \qquad (2)$$

[Math. 3]

$$-\omega_{max} \leq \omega \leq +\omega_{max} \qquad (3)$$

A path length C for the transport robot 101 to reach, from the initial position $(x_0, y_0, \theta_0)$, the target position $(x_a, 0, 0)$ on the target travel line is expressed by Expression (4) below.

[Math. 4]

$$C = \int_0^{x_a} \sqrt{1 + \left(\frac{dx}{dy}\right)^2} dx = \int_0^T V\sqrt{1 + \tan^2\theta} \cos\theta \, dt = VT \qquad (4)$$

In Expression (4) above, a time T denotes the time required for the transport robot 101 to reach, from the initial position $(x_0, y_0, \theta_0)$, the target position $(x_a, 0, 0)$.

Note that the above-described overview of the example embodiments is an example, and example embodiments of the present invention are not limited thereto. The example embodiments of the present invention are applicable, without being limited to a transport robot configured to transport goods, to a moving body configured to follow a target travel line. In this case, a transport system is also referred to as a moving body control system.

2. FIRST EXAMPLE EMBODIMENT

Next, a first example embodiment will be described in more detail with reference to FIG. 4 to FIG. 30.

2.1. System Configuration

Figure 4:
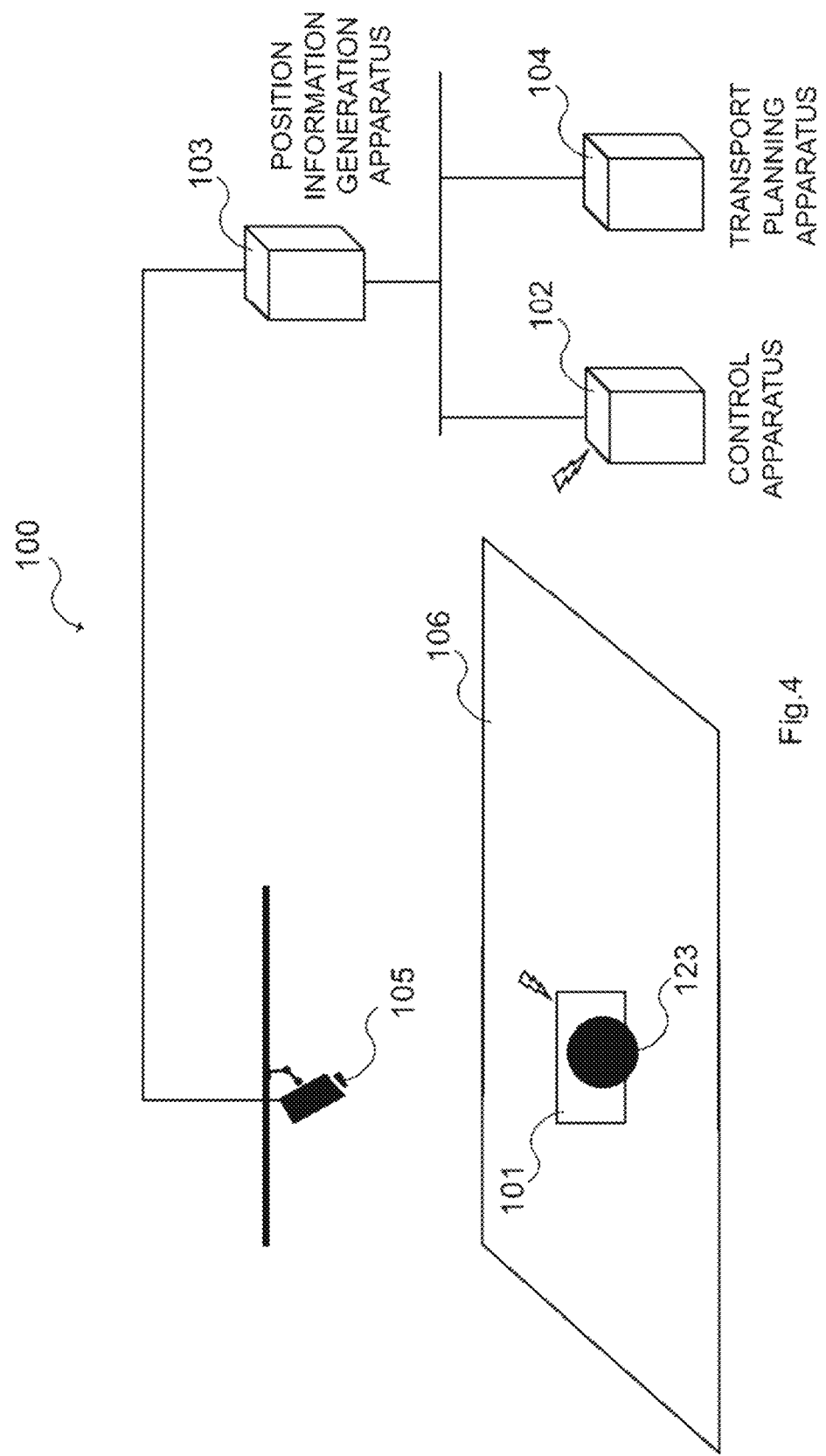
FIG. 4 is a diagram illustrating an example of a schematic configuration of a transport system according to a first example embodiment.

FIG. 4 is a diagram illustrating an example of a schematic configuration of a transport system according to the first example embodiment. A transport system 100 includes a transport robot 101, a control apparatus 102, a position information generation apparatus 103, a transport planning apparatus 104, and a camera apparatus 105. Note that the configuration illustrated in FIG. 4 is an example and is not intended to limit the number of transport robots 101 and the number of camera apparatuses 105 included in the transport system 100.

The transport robot 101 is configured to be capable of communicating with the control apparatus 102 and to move based on a control command (control information) from the control apparatus 102 to transport goods (not illustrated). The transport robot 101 includes a pair of driving wheels 123 arranged with axles of the respective driving wheels 123 passing through the center of gravity of the transport robot 101.

The camera apparatus 105 is an apparatus configured to capture an image of a field 106. The transport system 100 includes a depth camera, a stereo camera, or the like, for example. The depth camera is a camera capable of capturing a depth image with each pixel value of an image indicating the distance from the camera to an object. The stereo camera is a camera enabling, by capturing using two cameras, images of an object in a plurality of different directions, measurement related to a depth direction (height direction) of the object.

The camera apparatus 105 is installed in a ceiling, a pillar, or the like. It may be configured so that pieces of image data obtained by a plurality of camera apparatuses 105 are combined to be able to overlook the field 106.

The camera apparatus 105 is connected to the position information generation apparatus 103. The camera apparatus 105 captures an image of the field 106 at predetermined intervals (in a predetermined sampling period) and transmits image data to the position information generation apparatus

103. The camera apparatus 105 captures an image of a situation of the field 106 in real time and transmits image data including the situation to the position information generation apparatus 103.

The position information generation apparatus 103 generates information related to the position of an article in the field 106 (for example, a factory or a distribution warehouse). The position information generation apparatus 103 identifies the article located in the field 106, based on the image data received from the camera apparatus 105 and generates position information of the article. For example, the position information generation apparatus 103 generates position information of the transport robot 101.

The position information generation apparatus 103 analyzes the image data acquired from the camera apparatus 105 and thereby identifies the article in the field 106 (for example, the transport robot 101, goods to be transported, an obstacle placed in the field 106, or the like). Note that the position information generation apparatus 103 may treat an article not present in an initial state of the field 106, as an "obstacle."

The position information generation apparatus 103 calculates the position (absolute position) of the object in the three-dimensional coordinate system (X axis, Y axis, and Z axis) having any one point (for example, an entrance) in the field 106 as the origin. The position information generation apparatus 103 transmits position information of the article (referred to as article position information below) obtained through the calculation to the control apparatus 102. Alternatively, the position information generation apparatus 103 may calculate the position of the object in the two-dimensional coordinate system (X axis and Y axis) having any one point in the field 106 as the origin.

The transport planning apparatus 104 generates goods transport plan information including information related to a transport source and a transport destination of goods to be transported by the transport robot 101. Specifically, the transport planning apparatus 104 provides an operation screen (graphical user interface (GUI)) through which the transport source and the transport destination of the goods to be transported specified by an operator are input. The transport planning apparatus 104 generates the goods transport plan information, based on the information input through the GUI. The transport planning apparatus 104 transmits the generated goods transport plan information to the control apparatus 102.

The control apparatus 102 uses the article position information acquired from the position information generation apparatus 103 and the goods transport plan information acquired from the transport planning apparatus 104, to control the transport robot 101. When the control apparatus 102 acquires the transport plan information, the control apparatus 102 selects the transport robot 101 standing by in the field 106 and instructs the selected transport robot 101 to head for the transport source included in the transport plan information. Specifically, the control apparatus 102 transmits a control command (control information) to the selected transport robot 101 to remotely control the transport robot 101 to head for the transport source.

The transport robot 101 moves to the transport source, based on the control command from the control apparatus 102, and, when preparation for transport of the goods is completed, transmits a "completion notification" to the control apparatus 102. Note that such a completion notification need not be transmitted from the transport robot 101 in some control methods of the control apparatus 102. For example, the control apparatus 102 may determine that transport preparation by the transport robot 101 is competed, a predetermined time period (for example, 30 seconds) after move of the transport robot 101 to a predetermined position.

When the control apparatus 102 acquires the completion notification of the transport preparation from the transport robot 101, the control apparatus 102 transmits a control command to the transport robot 101 to remotely control the transport robot 101 to move to the transport destination included in the goods transport plan information.

Next, a functional configuration of each of the apparatuses included in the transport system 100 will be described.

Figure 5:
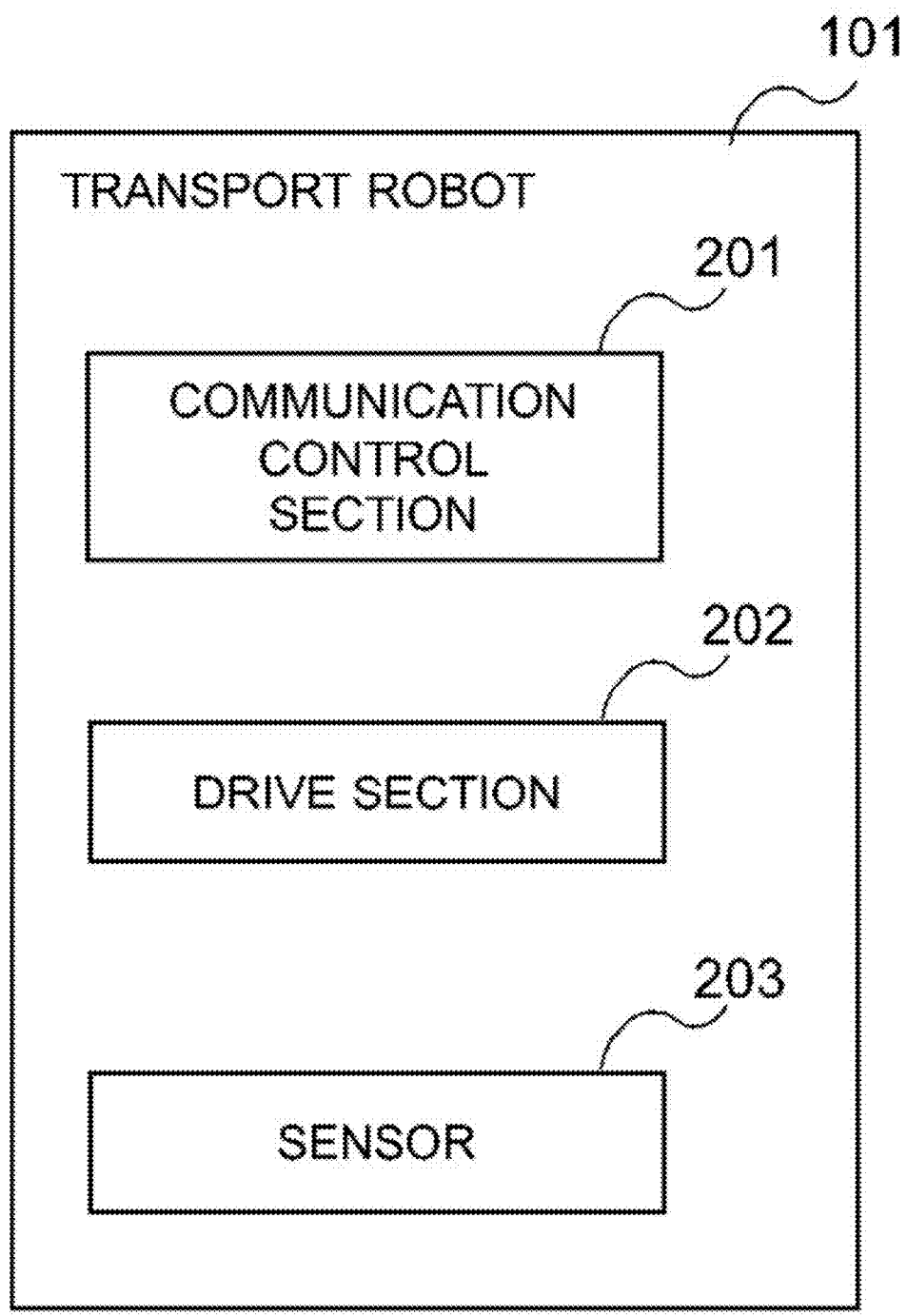
FIG. 5 is a diagram illustrating an example of a functional configuration of a transport robot according to the first example embodiment.

FIG. 5 is a diagram illustrating an example of a functional configuration (processing modules) of the transport robot according to the first example embodiment. The transport robot 101 includes a communication control section 201, a drive section 202, and a sensor 203.

The communication control section 201 is a means to control communication with the control apparatus 102. The communication control section 201 communicates with the control apparatus 102 by using a radio communication means, for example, a wireless local area network (LAN), long term evolution (LTE), or a network used in a specific area such as local 5G, or the like.

The drive section 202 is a means to drive two wheels of the transport robot 101, based on the control command (control information) received from the control apparatus 102. For example, the control apparatus 102 transmits a control command including rotation start of a motor, the rotation speed of the motor, rotation stop of the motor, or the like, to the transport robot 101. The drive section 202 controls the motor or the like in accordance with the control command to drive the two wheels of the transport robot 101.

The sensor 203 detects the orientation of the transport robot 101. The transport robot 101 transmits information related to the detected orientation of the transport robot 101 to the control apparatus 102 via the communication control section 201. For example, the sensor 203 may be a gyro sensor.

Figure 6:
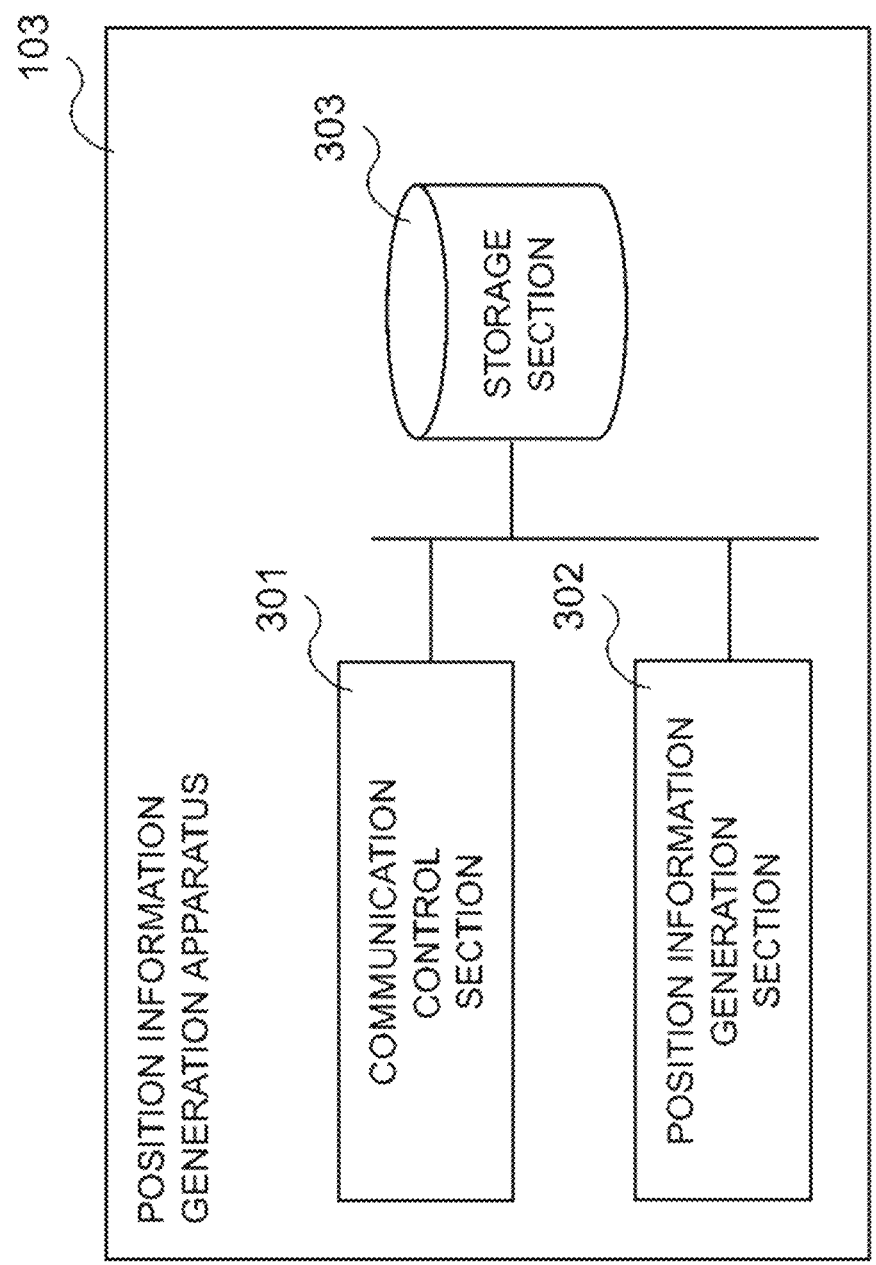
FIG. 6 is a diagram illustrating an example of a functional configuration of a position information generation apparatus according to the first example embodiment.

FIG. 6 is a diagram illustrating an example of a functional configuration (processing modules) of the position information generation apparatus according to the first example embodiment. The position information generation apparatus 103 includes a communication control section 301, a position information generation section 302, and a storage section 303.

The communication control section 301 is a means to control communication with other apparatuses (for example, the camera apparatus 105 and the control apparatus 102) connected with wires (for example, a LAN, an optical fiber, or the like) or wirelessly.

The position information generation section 302 is a means to generate article position information described above. The position information generation section 302 generates article position information, based on image data acquired from the camera apparatus 105.

The camera apparatus 105 transmits the image data together with the identifier (ID) of the camera apparatus 105 itself to the position information generation apparatus 103. The position information generation apparatus 103 identifies the camera apparatus 105 being the transmission source of the image data, based on the identifier. The camera apparatus 105 is fixed to a ceiling or the like and continuously transmits image data of the field 106 to the position information generation apparatus 103.

The position information generation section 302 detects an article in the following method, for example. The storage section 303 stores information associating the identifier of the camera apparatus 105 and an area for the camera apparatus 105 to capture an image. The position information generation section 302 refers to the association information to thereby be able to grasp the area in the field 106 to which the acquired image data corresponds.

The storage section 303 stores initial image data of the area for the camera apparatus 105 to capture an image. The initial image data is image data including no article absent in the field 106 in the initial state. The position information generation section 302 compares the acquired image data and the initial image data corresponding to the acquired image data, and determines, if there is any difference, that any of articles to be detected is included in the image data. Note that the articles to be detected by the position information generation section 302 include the transport robot 101, goods to be transported, an obstacle placed in a passage in the field 106, and the like.

Note that determination about articles by the position information generation section 302 is not limited to the method using the initial image data. For example, the position information generation section 302 may calculate coordinates of an article, and detect that an article is present in the passage (on the link), based on the coordinates of the article and normal coordinate information of the field.

In a case of detecting an article, the position information generation section 302 approximates the article to have a rectangular shape, for example, and calculates the coordinates of the four points of the rectangular shape. Specifically, the position information generation section 302 calculates relative coordinates (X coordinate and Y coordinate) of the article with respect to the absolute coordinates of a reference point of the image data (for example, lower left of the image), based on the number of pixels from the reference point to the article. In this event, the position information generation section 302 calculates the relative coordinates of the object, based on information (the resolution of an image sensor and the like) of the camera apparatus 105 by which the image data is acquired.

The absolute coordinates of the reference point of the acquired image data are known in advance. The position information generation section 302 adds the calculated relative coordinates of the article to the absolute coordinates of the reference point, to thereby calculate the absolute coordinates (XY coordinates) of the article in the field. Further, when an image data is already obtained by the depth camera through capturing, the position information generation section 302 reads the pixel value corresponding to the calculated X coordinate and Y coordinate, to thereby use the pixel value as the Z coordinate (height) of the article.

The position information generation section 302 performs such processing for each of four corners of the article, to thereby calculate the absolute positions of the four points forming the article.

The position information generation section 302 determines the kind of article included in the acquired image. The position information generation section 302 calculates the size of the detected article from the absolute coordinates of the four points. The position information generation section 302 may determine the kind of article, based on the calculated size. For example, since the size of the transport robot 101 is known in advance, the position information generation section 302 determines, when the size of the article and the size of the transport robot 101 match, that the detected article is the transport robot 101. In contrast, when the size of the detected article and the size of the transport robot 101 do not match, the position information generation section 302 determines that the detected article is an obstacle.

Note that the method of determining whether an article is a transport robot, based on the size of the article, is an example, and any other methods can be used. For example, the transport robot 101 may be detected by attaching a marker having an identification function, such as a QR code (registered trademark) or an augmented reality (AR) marker, to the transport robot 101, and the position information generation section 302 reading the marker. In the first example embodiment, a description will be given by assuming that the marker is attached to the transport robot 101, a detected article is the transport robot 101, and identification of the transport robot 101 is possible. Alternatively, the position information generation section 302 may transmit a particular signal or message to the transport robot 101, and the transport robot 101 having received the signal or the like may respond with an identification number or the like, to thereby identify the transport robot 101. In other words, even though identification information (for example, a character or pattern) is not provided on the outside of the transport robot 101, the position information generation section 302 can identify the transport robot 101, based on the signal or the like from the transport robot 101.

The position information generation section 302 transmits the kind of detected article (the transport robot 101, an obstacle, or the like) and the absolute position of the article to the control apparatus 102. Note that the absolute position of the article may be the calculated absolute coordinates of the four points forming the article or may be the absolute coordinates of one point (for example, the center of the article) representing the article.

Figure 7:
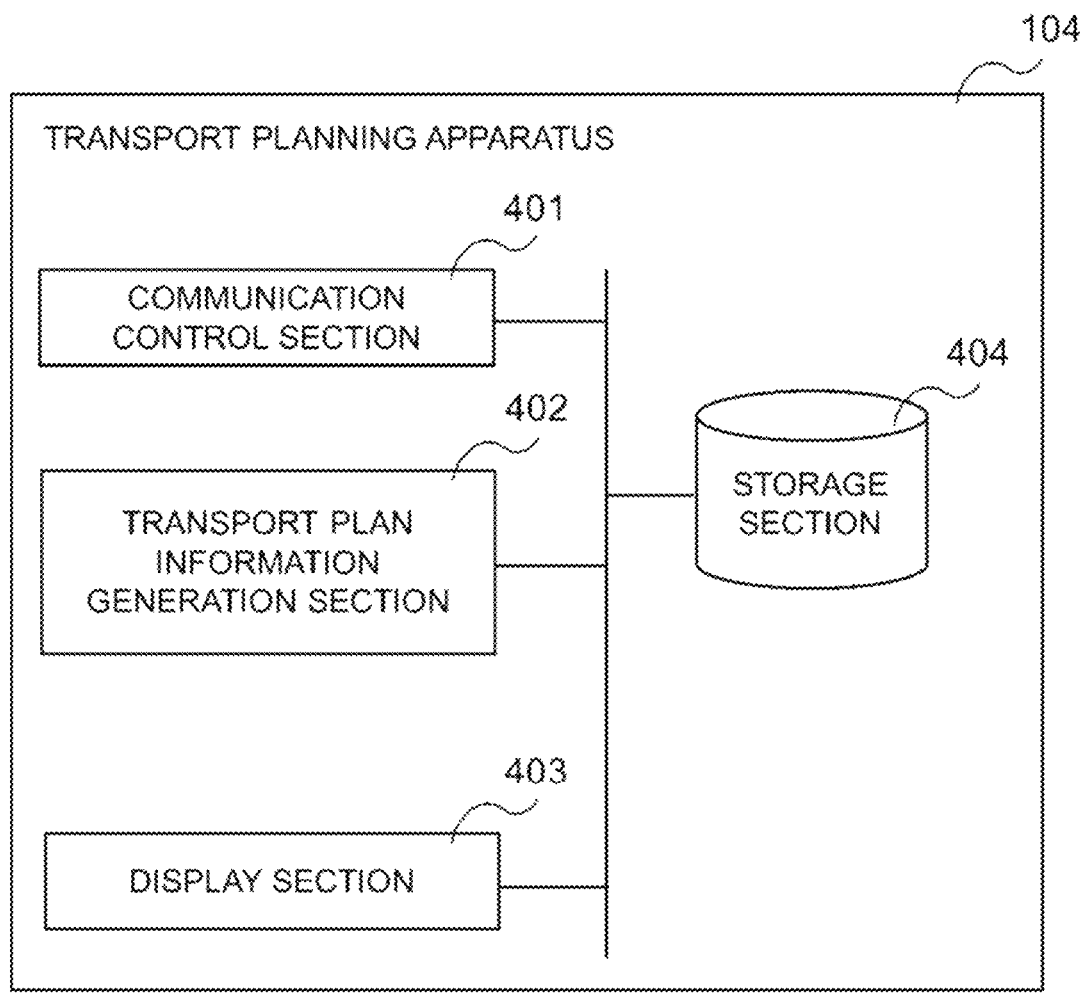
FIG. 7 is a diagram illustrating an example of a functional configuration of a transport planning apparatus according to the first example embodiment.

FIG. 7 is a diagram illustrating an example of a functional configuration (processing modules) of the transport planning apparatus according to the first example embodiment. The transport planning apparatus 104 includes a communication control section 401, a transport plan information generation section 402, a display section 403, and a storage section 404.

The communication control section 401, similarly to the communication control section 301 of the position information generation apparatus 103, is a means to control communication with other apparatuses.

The transport plan information generation section 402 is a means to generate goods transport plan information described above. The transport plan information generation section 402 generates information related to a GUI through which the transport source and the transport destination of the goods to be transported specified by an operator are input. The transport plan information generation section 402 passes GUI information thus generated to the display section 403. The display section 403 displays the GUI information on the display section 403. The display section 403 may be, for example, a liquid crystal display or the like. Alternatively, the transport plan information generation section 402 may generate information for displaying the GUI on a terminal (not illustrated) used by the operator and transmit generated information to the terminal.

The transport plan information generation section 402 displays a screen as that illustrated in FIG. 8, for example. The transport plan information generation section 402 transmits information input by the operator, to the control apparatus 102. Specifically, the transport plan information generation section 402 associates information specifying goods to be transported (for example, the name of the goods, a serial number, or the like), the place where the goods are placed (transport source), and the transport destination of the goods with each other, and transmits the associated information, as the goods transport plan information, to the control apparatus 102.

Note that, in a case where the transport destination and the like are exchanged using a name or the like in the field, between the transport planning apparatus 104 and the control apparatus 102, the absolute coordinates for each name in the field are shared between the transport planning apparatus 104 and the control apparatus 102 in advance. Alternatively, the transport plan information generation section 402 may convert a name in the field input by the operator into the absolute coordinates in the field and transmit the absolute coordinates obtained through the conversion to the control apparatus 102.

Figure 9:
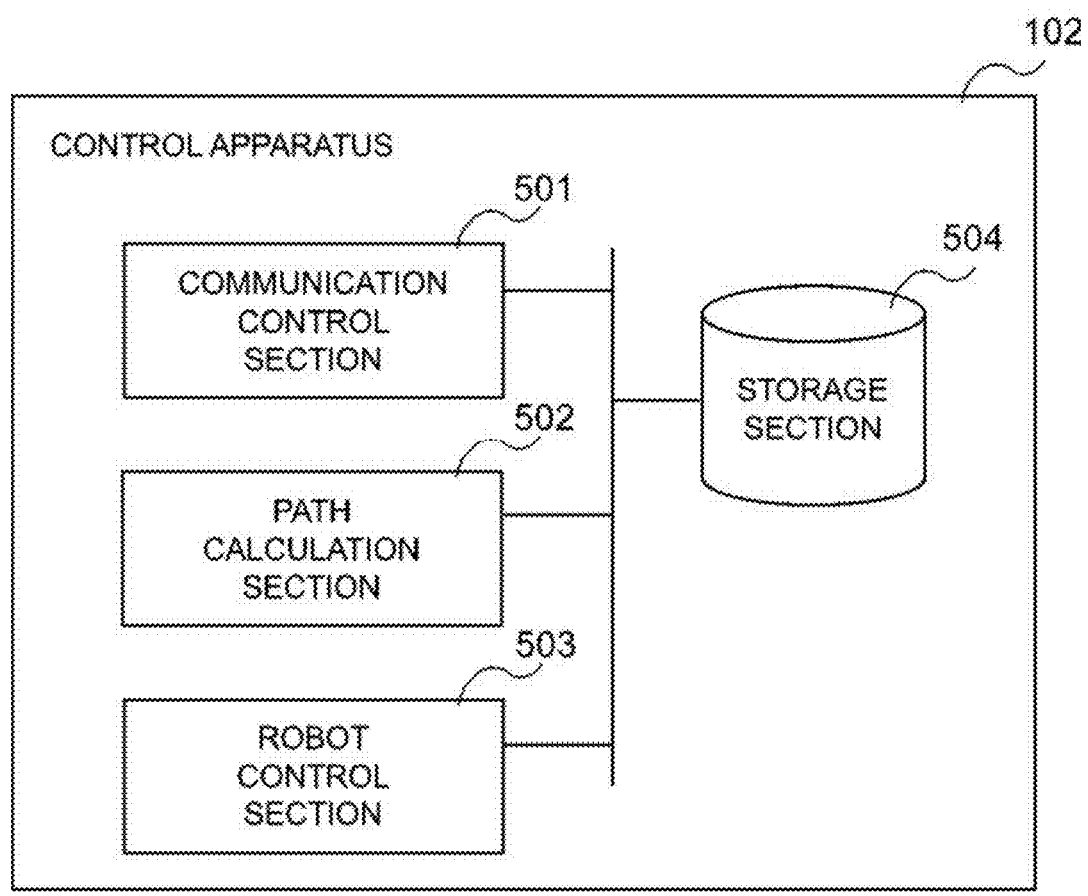
FIG. 9 is a diagram illustrating an example of a functional configuration of a control apparatus according to the first example embodiment.

FIG. 9 is a diagram illustrating an example of a functional configuration (processing modules) of the control apparatus according to the first example embodiment. The control apparatus 102 includes a communication control section 501, a path calculation section 502, a robot control section 503, and a storage section 504.

The communication control section 501, similarly to the communication control section 401 of the transport planning apparatus 104 and the like, controls communication with other apparatuses. The communication control section 501 stores the goods position information acquired from the position information generation apparatus 103 and goods transport plan information acquired from the transport planning apparatus 104, in the storage section 504.

The path calculation section 502 is a means to calculate the path (for example, the target travel line) for the transport robot 101 to transport the goods from the transport source to the transport destination, based on the goods transport plan information generated by the transport planning apparatus 104. The path calculation section 502 uses, for example, a path search algorithm, such as Dijkstra's algorithm or Bellman-Ford algorithm, to calculate the path for transporting the goods from the transport source to the transport destination. The path calculation section 502 stores, in the storage section 504, the calculated path and the transport robot 101 to use the path in association with each other.

The robot control section 503 is a control means to control the transport robot 101. The robot control section 503 transmits control information for transporting the goods by the transport robot 101, to the transport robot 101. Specifically, the robot control section 503 transmits a control command (control information) to the transport robot 101 to control the transport robot 101. Note that the robot control section 503 may transmit all control commands at once to allow the transport robot 101 to move from the transport source to the transport destination, or may sequentially transmit the control commands according to the position and the like of the transport robot 101.

The robot control section 503 generates a control command so that the transport robot 101 travel to follow in the path calculated by the path calculation section 502 and transmits the control command to the transport robot 101.

When the transport robot 101 is to move straight ahead, the robot control section 503 calculates the time and speed for the motor of the transport robot 101 to rotate, based on the distance between the current position of the transport robot 101 and a calculated arrival position.

To rotate (or to turn) the transport robot 101, the robot control section 503 uses a model of a circular movement to draw a curve by the velocity difference between the right and left wheels. Specifically, the robot control section 503 calculates input velocities of the right and left wheels to reach a target position from the current position in a circular orbit, based on the target position and the position and orientation of the transport robot 101. The robot control section 503 generates a control command to transmit to the transport robot 101, based on the calculated input velocities.

Note that the control apparatus 102 is implementable as a cloud server in a network (for example, a radio communication network such as the Internet or LTE).

Figure 10:
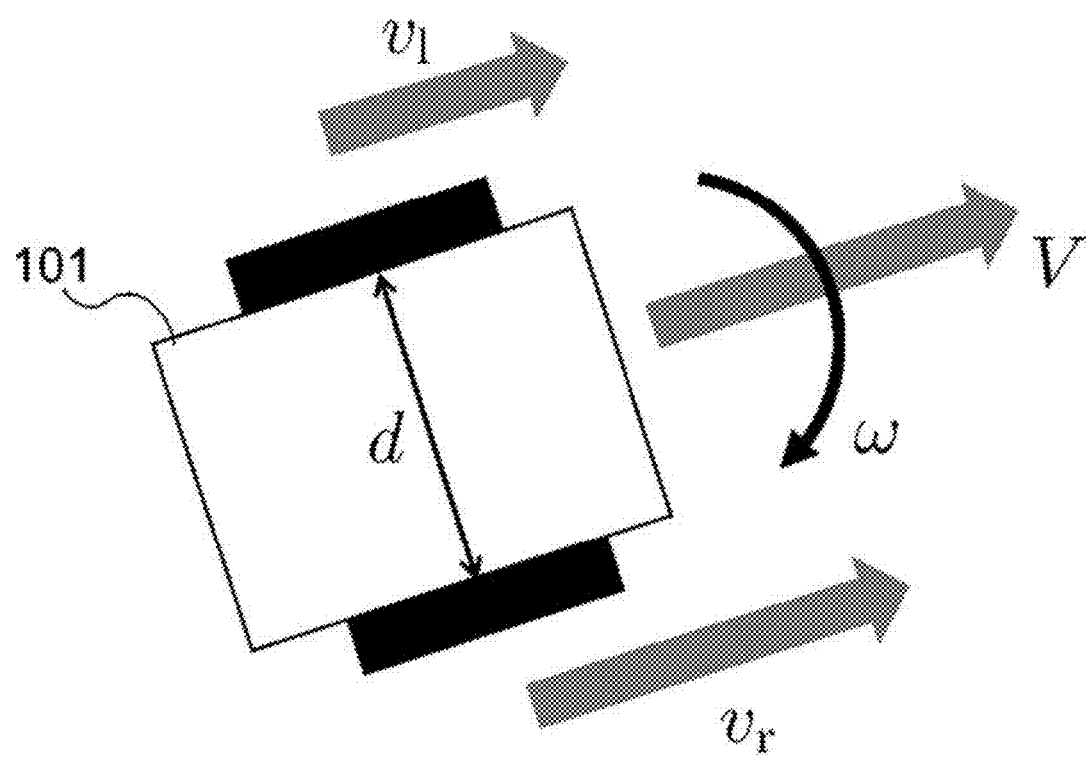
FIG. 10 is a diagram for describing of processing for calculating wheel velocities to the first example embodiment.

Next, processing for calculating right and left wheel velocities of the transport robot 101 will be described in detail with reference to FIG. 10. A left wheel velocity $v_l$ [m/s] and a right wheel velocity $v_r$ [m/s] of the transport robot 101 can be calculated by using the center-of-gravity velocity V [m/s] and the angle velocity ω [rad/s] of the transport robot 101.

The center-of-gravity velocity V of the transport robot 101 can be expressed by Expression (5) below.

[Math. 5]
$$V = \frac{v_r + v_l}{2} \quad (5)$$

The angle velocity ω of the transport robot 101 can be expressed by Expression (6) below by using a distance d [m] between the right and left wheels.

[Math. 6]
$$\omega = \frac{v_r - v_l}{d} \quad (6)$$

Hence, the right wheel velocity $v_r$ and the left wheel velocity $v_l$ can be calculated as expressed in Expressions (7) and (8) below, respectively.

[Math. 7]
$$v_r = V + \frac{\omega d}{2} \quad (7)$$

[Math. 8]
$$v_l = V - \frac{\omega d}{2} \quad (8)$$

In the present example embodiment, since the center-of-gravity velocity V of the transport robot 101 is fixed, the right and left wheel velocities can be calculated by obtaining the angle velocity ω. The control apparatus 102 transmits a control command to the transport robot 101 according to the right and left wheel velocities thus calculated.

Figure 11:
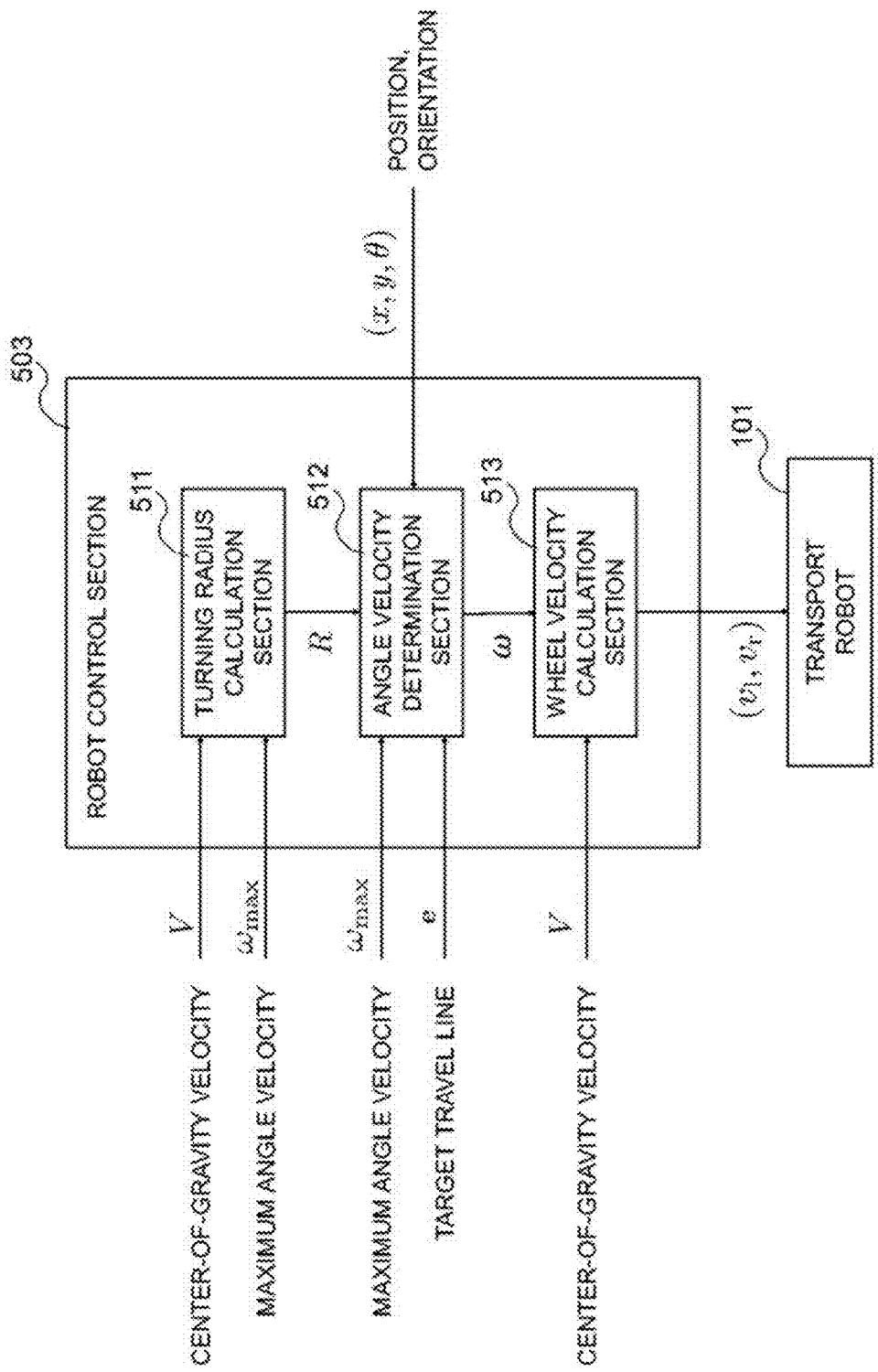
FIG. 11 is a diagram illustrating an example of a functional configuration of the robot control section according to the first example embodiment.

Next, with reference to FIG. 11, a description will be given of an example of a functional configuration (processing modules) of the robot control section 503 configured to perform the above-described processing for calculating right and left wheel velocities.

The robot control section 503 includes a turning radius calculation section 511, an angle velocity determination section 512, and a wheel velocity calculation section 513.

The turning radius calculation section 511 uses the center-of-gravity velocity V and the maximum angle velocity $\omega_{max}$ set in advance, to calculate a turning radius R $(=V/\omega_{max})$ of the transport robot 101. The center-of-gravity velocity V and the maximum angle velocity $\omega_{max}$ set in advance can be stored in the storage section 504 of the control apparatus 102, and the turning radius calculation section 511 can acquire the center-of-gravity velocity V and the maximum angle velocity $\omega_{max}$ thus stored, to calculate the turning radius R.

The angle velocity determination section 512 uses the calculated turning radius R, the target travel line calculated by the path calculation section 502, position information of the transport robot 101 acquired from the position information generation apparatus 103, and the orientation (angle) of the transport robot 101 detected by the sensor 203 of the transport robot 101, to determine the angle velocity of the transport robot 101. The angle velocity is determined from among $-\omega_{max}$, 0, $+\omega_{max}$ (i.e., ternary control) by using the maximum angle velocity $\omega_{max}$ set in advance. The target travel line is acquired as a vector e corresponding to the X axis. The position information acquired from the position information generation apparatus 103 is converted to position information with the target travel line (X axis) as a reference, and used. The position of the transport robot 101 at an original state is also referred to as an initial position $(x_0, y_0)$. The Y coordinate of the initial position corresponds to the distance from the target travel line (X axis). The orientation of the transport robot 101 is detected by the sensor 203 and is expressed by an angle θ between the target travel line (X axis) and the moving direction of the transport robot 101. The angle θ of the transport robot 101 at the original state is also referred to as an initial angle $\theta_0$. By the angle velocity determination section 512 determining the angle velocity ω, a path to return to the target travel line is also determined. In other words, the angle velocity determination section 512 can function as a determination means configured to determine a path to return to the target line.

The wheel velocity calculation section 513 uses the determined angle velocity ω, the center-of-gravity velocity V, and the distance d between the right and left wheels, to calculate the right and left wheel velocities $v_r$ and $v_l$ as expressed in Expressions (7) and (8) described above. The wheel velocity calculation section 513 transmits control information for controlling the transport robot 101, based on the calculated right and left wheel velocities $v_r$ and $v_l$. In other words, the wheel velocity calculation section 513 can function as a control means configured to control the transport robot 101 so that the transport robot 101 can travel on the path to return to the target travel line.

FIGS. 12 to 19 are diagrams illustrating concrete examples of a path according to an angle velocity determined by the robot control section 503. In each of FIGS. 12 to 19, the X axis (y=0) corresponds to the target travel line.

Figure 12:
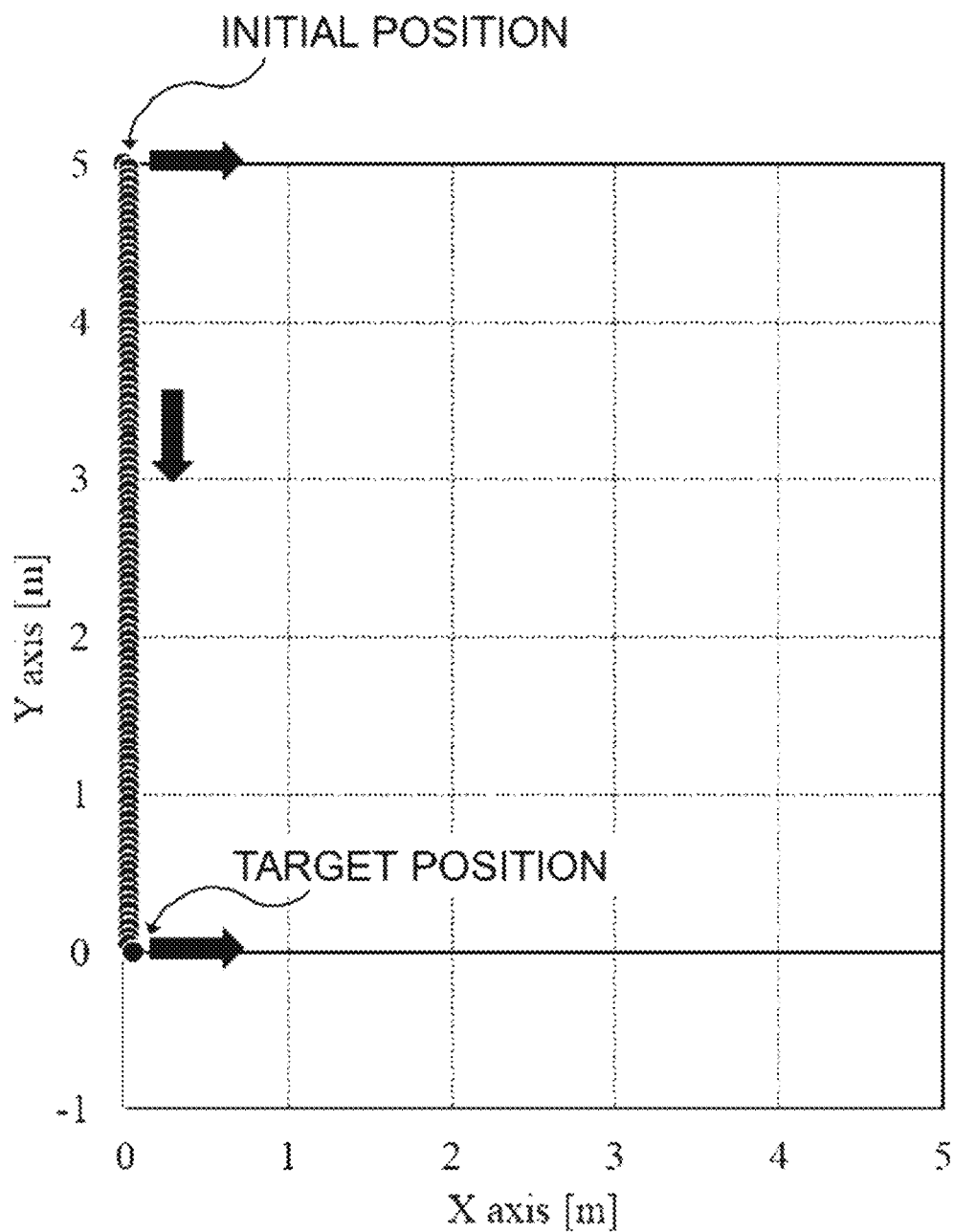
FIG. 12 is a diagram for describing concrete examples of a path according to the first example embodiment.

FIG. 12 illustrates a case where the initial angle $\theta_0$ is equal to 0 ($\theta_0$=0) with no limitation for the angle velocity w. Note that the path illustrated in FIG. 12 is an example of a case with no limitation for the angle velocity ω, and this is not applied to the present example embodiment. The transport robot 101 faces the same direction as that of the target travel line (X axis) ($\theta_0$=0), at the initial position. Since there is no limitation for the angle velocity ω, the transport robot 101 faces a direction (θ=−π/2) orthogonal to the X axis at the angle velocity ω=−∞ at a time t=0 and travels straight until reaching the X axis (y=0). When the transport robot 101 reaches the X axis, the transport robot 101 turns back to right beside (θ=0) at the angle velocity ω=+∞. In this way, the transport robot 101 can reach the target position (target travel line) with the shortest distance C=$y_0$ in the shortest time T=$y_0$/V. This example is strictly an example of a case with no limitation for the angle velocity ω.

Figure 13:
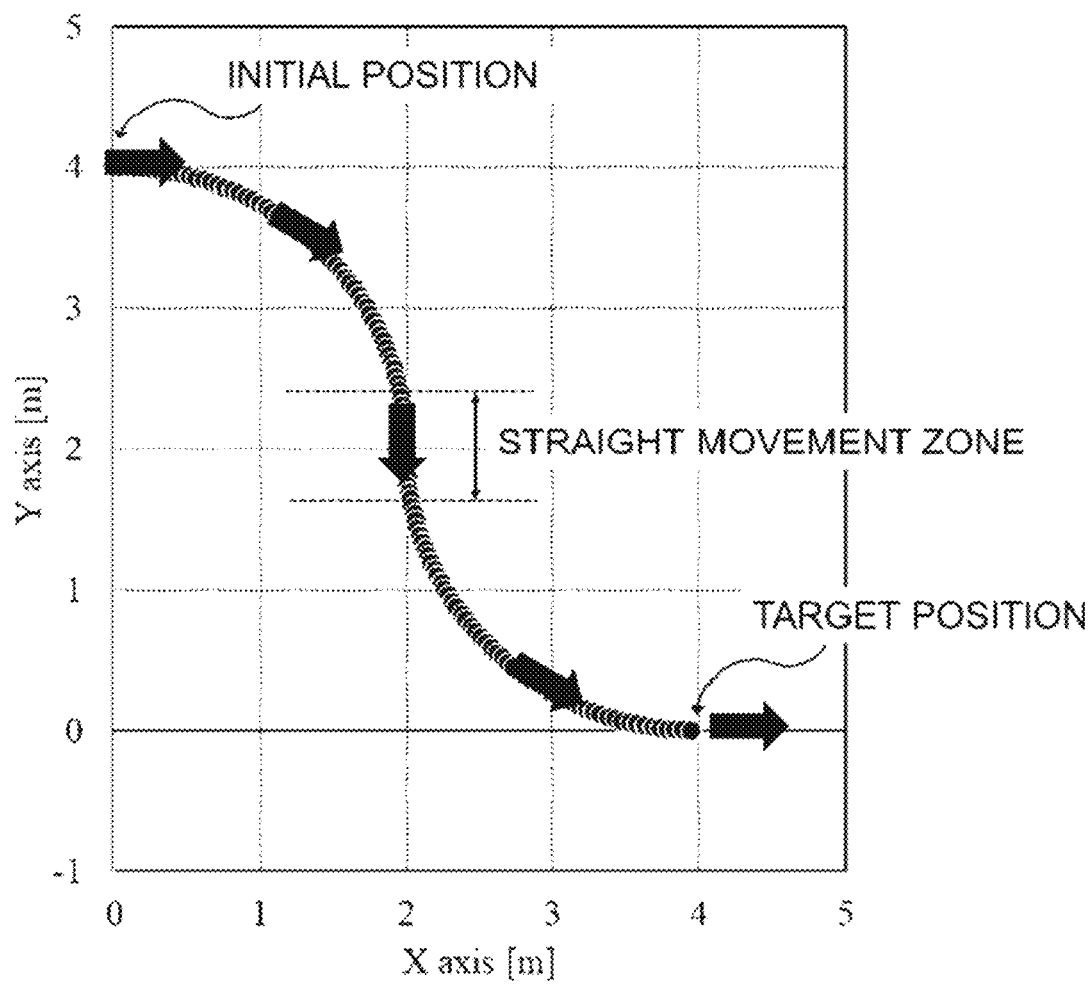
FIG. 13 is a diagram for describing concrete examples of a path according to the first example embodiment.

FIG. 13 illustrates an example of a case with a straight movement zone and the initial angle $\theta_0$ being equal to 0 ($\theta_0$=0). In the present example embodiment, since there is a limitation ($-\omega_{max} \leq \omega \leq +\omega_{max}$) for the angle velocity ω, the path illustrated in FIG. 13 can be the shortest path to the target travel line. Specifically, the angle velocity ω is equal to $-\omega_{max}$ (ω=$-\omega_{max}$)(turning path) up to the straight movement zone, then equal to 0 (ω=0) in the straight movement zone (straight movement path), and then equal to $+\omega_{max}$ (ω=$+\omega_{max}$)(turning path) in a zone for turning back to right beside. Whether the straight movement zone is involved depends on the turning radius R (=V/$\omega_{max}$) of the transport robot 101. When $y_0$ is larger than 2R ($y_0$>2R), the straight movement zone occurs. As described above, in the example in FIG. 13, the path to return to the target line is constituted of a combination of two turning paths having different angle velocities (turning directions) and one straight movement path. The two turning paths are paths for the transport robot 101 to turn at the two respective angle velocities different in terms of positive and negative signs.

Figure 14:
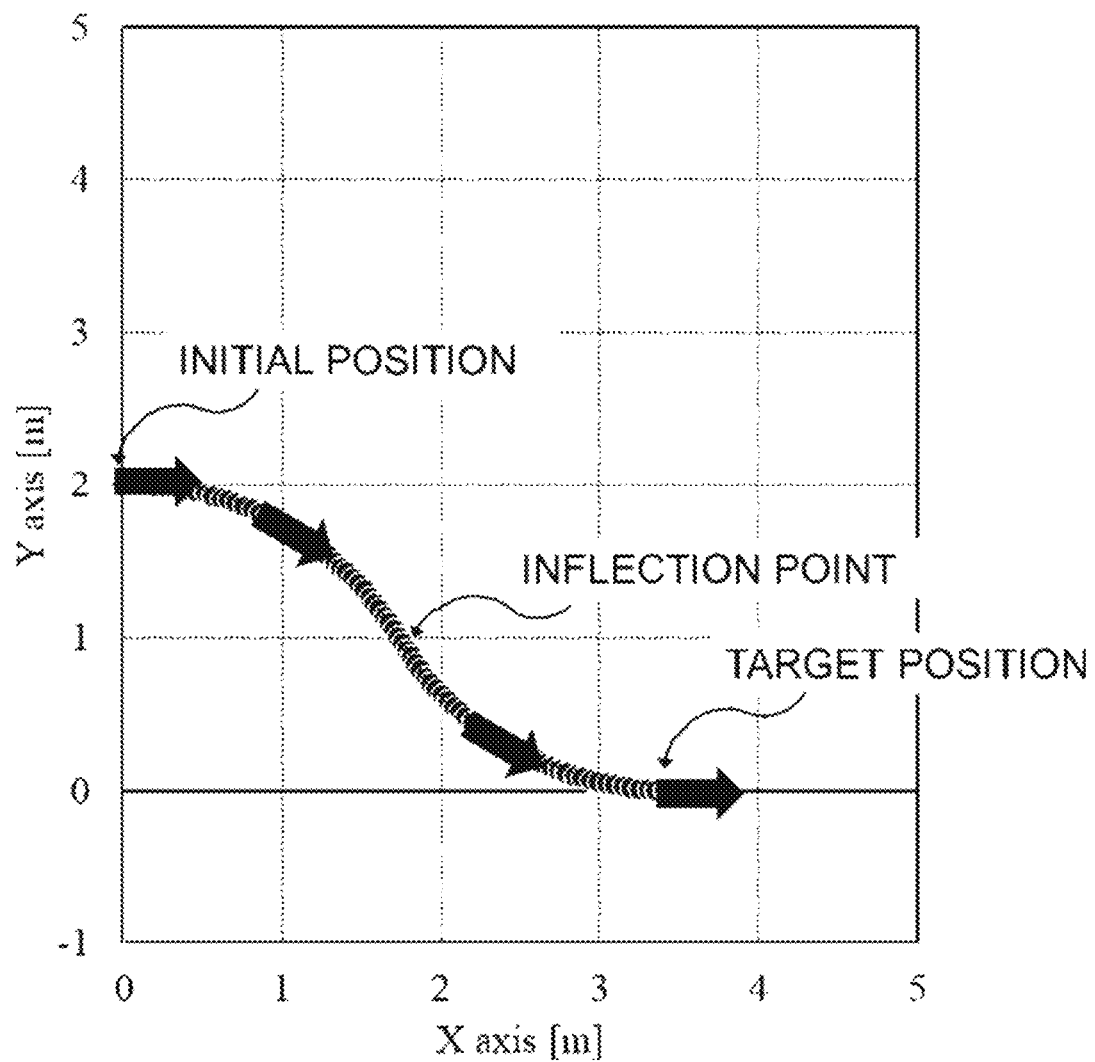
FIG. 14 is a diagram for describing concrete examples of a path according to the first example embodiment.

FIG. 14 illustrates an example of a case with no straight movement zone and the initial angle $\theta_0$ being equal to 0 ($\theta_0$=0). When the initial position is near the X axis ($y_0$<2R), the transport robot 101 cannot face right beside (θ=0) at the time point when reaching the X axis unless the transport robot 101 starts to turn back before facing the direction (θ=−π/2) orthogonal to the X axis. The starting point (inflection point) of the turning-back locates at the position corresponding to y=$y_0$/2 due to the symmetric property of the path. Even when the initial position $y_0$ is small, such a path can be the shortest path. In the example in FIG. 14, the path to return to the target line is constituted of a combination of two turning paths having different angle velocities (turning directions).

Figure 15:
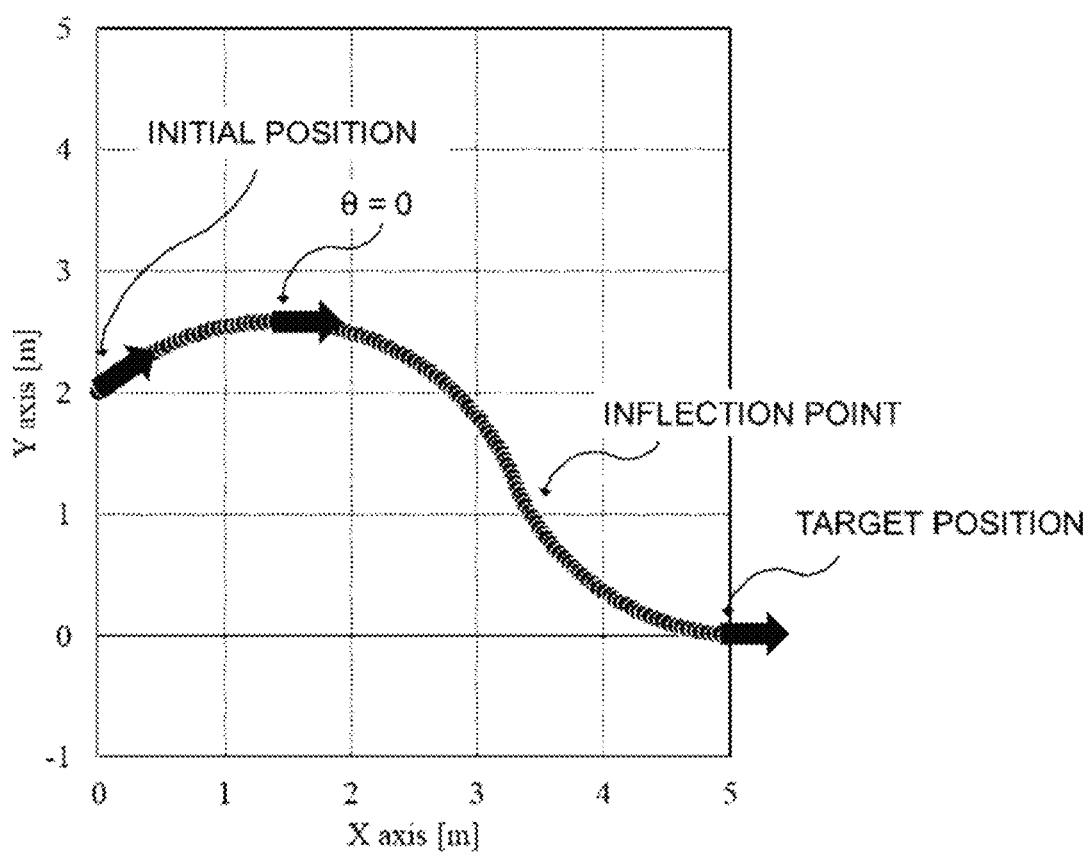
FIG. 15 is a diagram for describing concrete examples of a path according to the first example embodiment.

FIG. 15 illustrates an example of a case with the initial angle $\theta_0$ being larger than 0 ($\theta_0$>0). When the transport robot 101 faces $\theta_0$>0 at the initial position, the transport robot 101 first turns to turn back to the X-axis direction at the angle velocity ω being $-\omega_{max}$ (ω=$-\omega_{max}$). Consequently, the transport robot 101 inevitably results in facing right beside (θ=0). When the transport robot 101 is thereafter controlled similarly to a case where the initial angle θ is equal to 0 (θ=0). The range of the initial angle $\theta_0$ is 0 <$\theta_0$≤π/2, controlling the transport robot 101 as illustrated in FIG. 15 enables the shortest distance. Also in the example in FIG. 15, the path to return to the target line is constituted of a combination of two turning paths having different angle velocities (turning directions).

Figure 16:
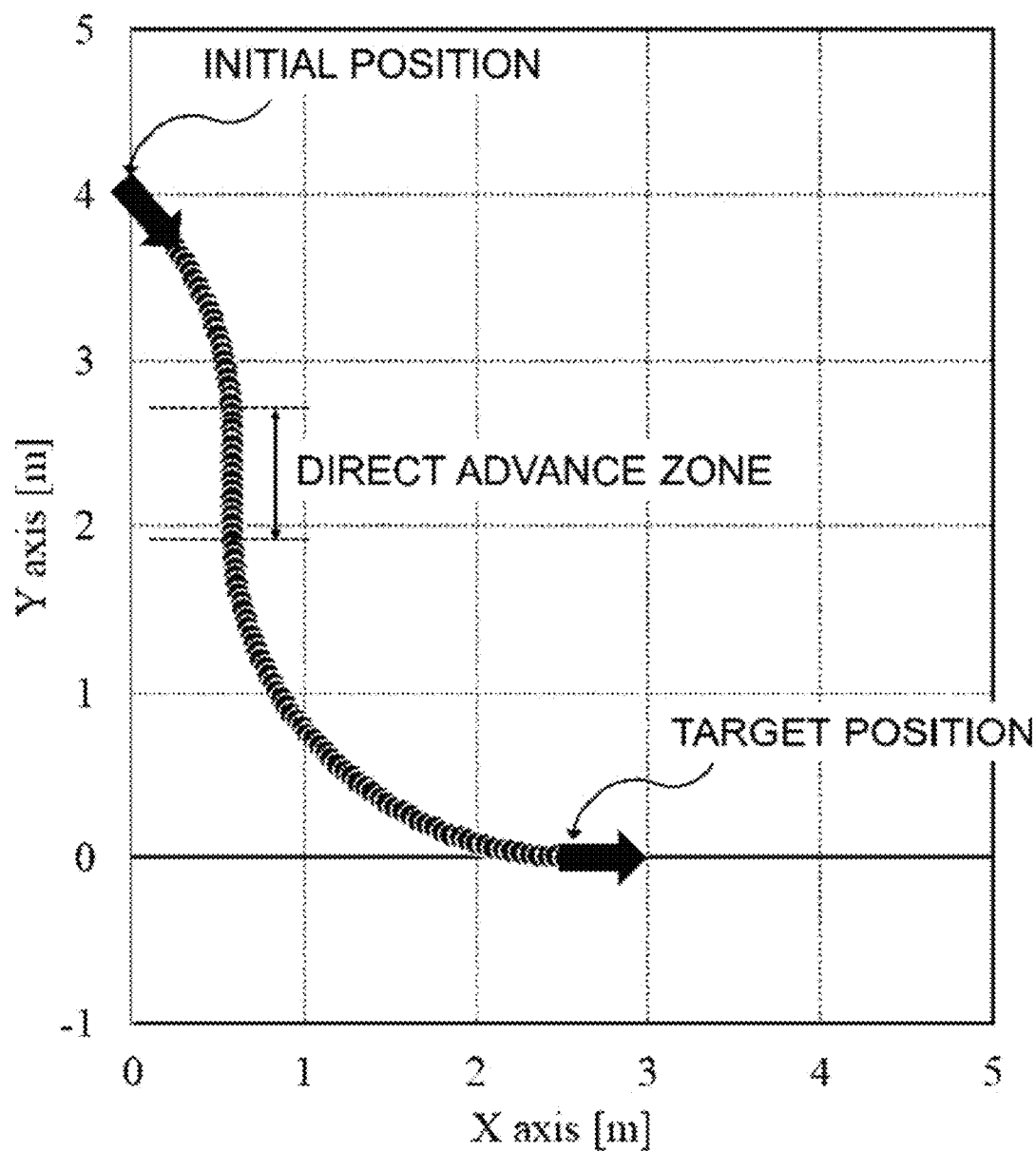
FIG. 16 is a diagram for describing concrete examples of a path according to the first example embodiment.
Figure 17:
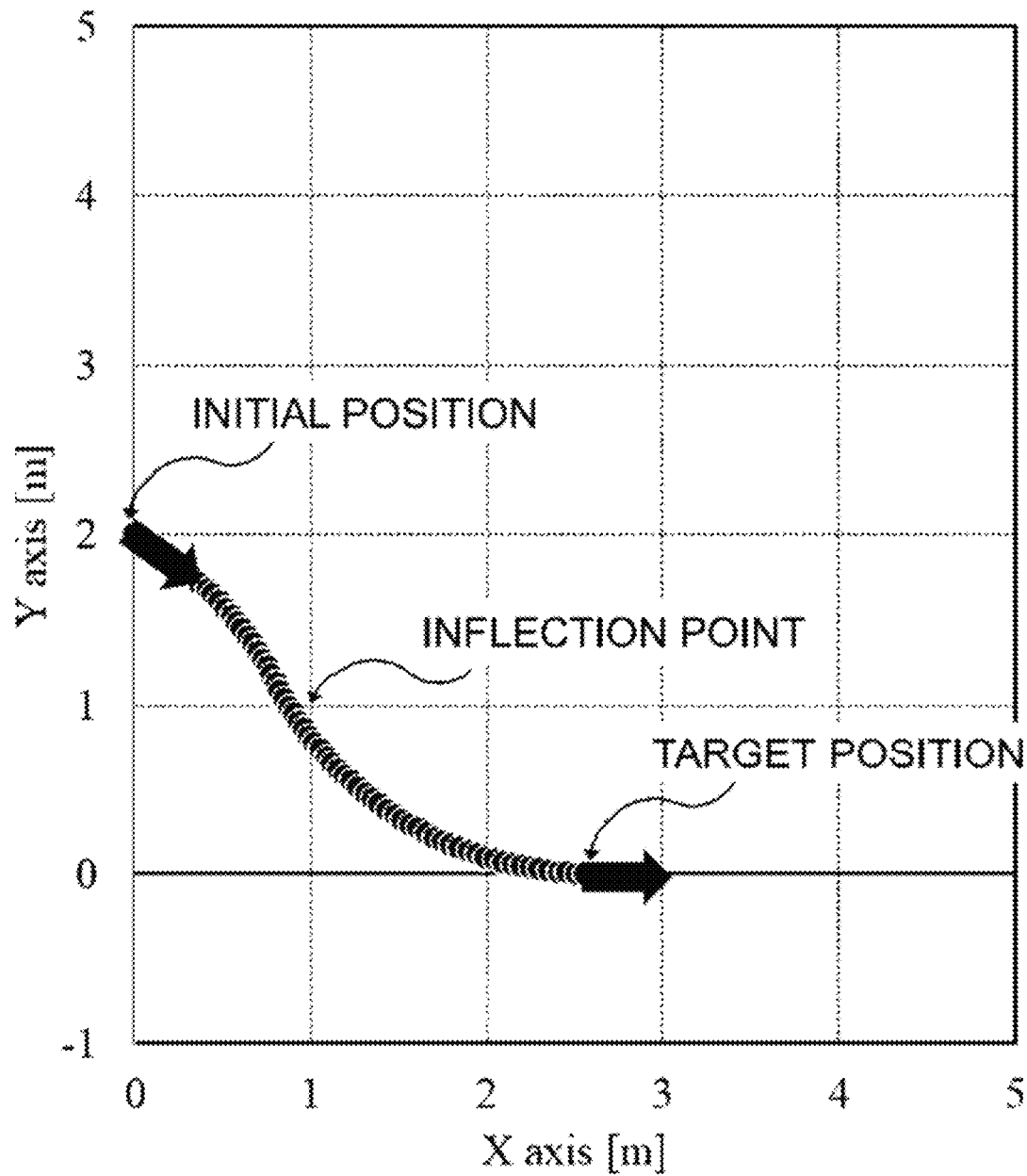
FIG. 17 is a diagram for describing concrete examples of a path according to the first example embodiment.
Figure 18:
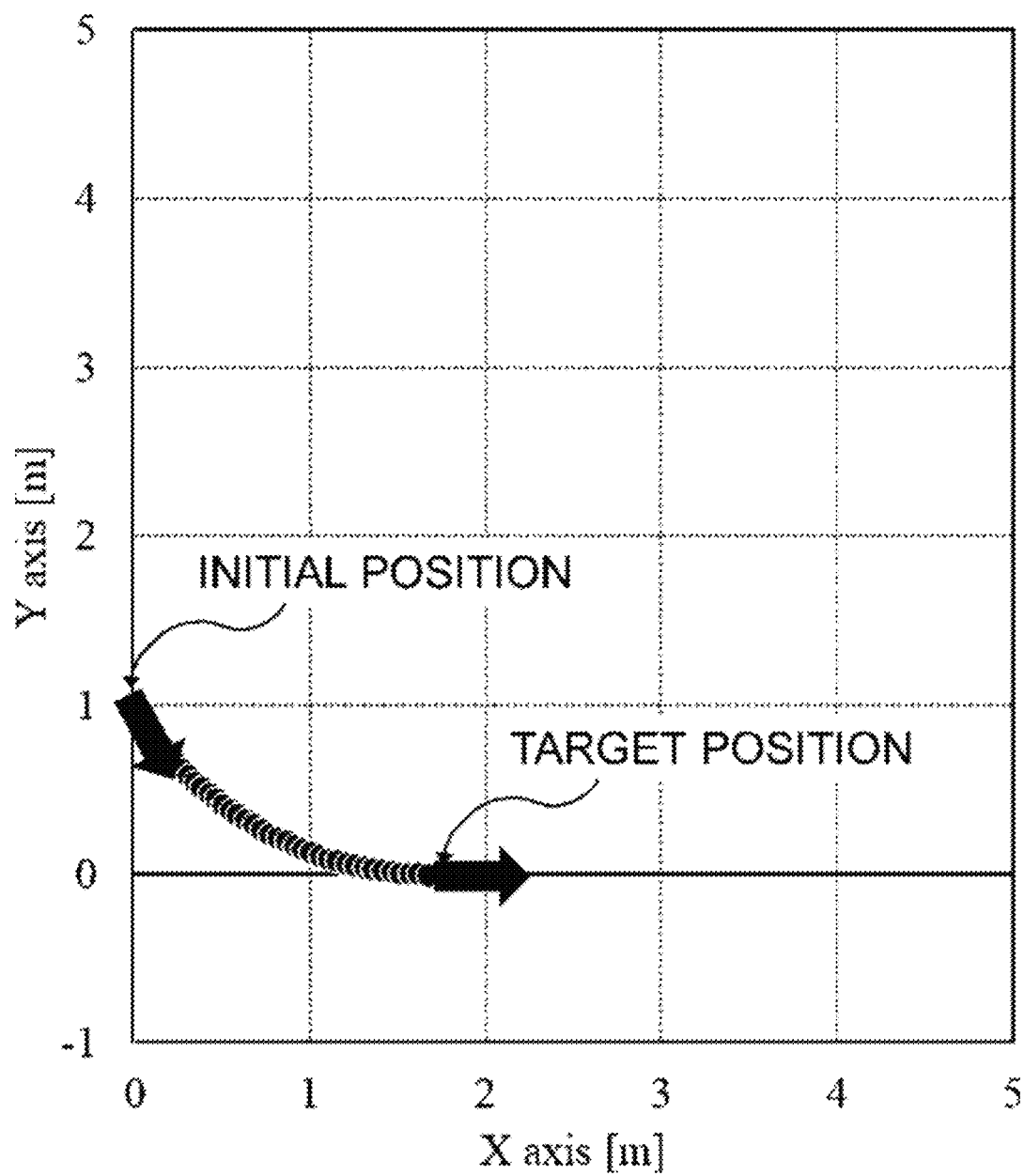
FIG. 18 is a diagram for describing concrete examples of a path according to the first example embodiment.
Figure 19:
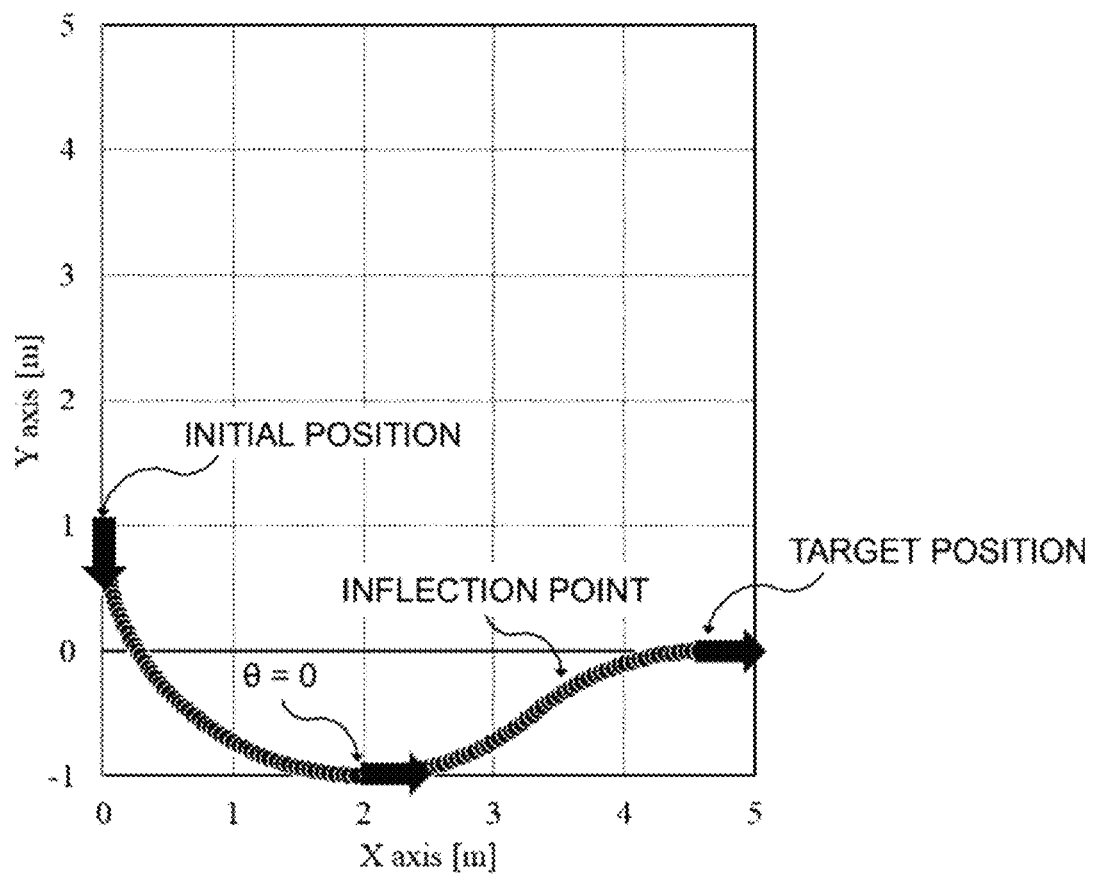
FIG. 19 is a diagram for describing concrete examples of a path according to the first example embodiment.

FIG. 16 to FIG. 19 each illustrate an example of a case with the initial angle $\theta_0$ being smaller than 0 ($\theta_0$<0). The example with a straight movement zone in FIG. 16 is included in the example in FIG. 13. The example with no straight movement zone in FIG. 17 is included in the example in FIG. 14. The example in FIG. 18 can be included in the example of the turning-back part in FIG. 13 or FIG. 14. The example in FIG. 19 illustrates an example of returning, after passing the X axis, from the fourth quadrant of the XY coordinates to the X axis (target line). In the example in FIG. 16, the path to return to the target line is constituted of a combination of two turning paths having different angle velocities (turning directions) and one straight movement path.

The four examples illustrated in FIG. 16 to FIG. 19 can be categorized as follows by using the initial Y-coordinate value $y_0$, the initial angle $\theta_0$, and the turning radius R=V/$\omega_{max}$.

Case where $y_0$>R(1−cos $\theta_0$)

This case corresponds to the example in FIG. 16 or FIG. 17. In the examples in FIG. 16 and FIG. 17, since the transport robot 101 has some room to the turning-back (inflection point), the transport robot 101 first turns to the X-axis direction at the angle velocity ω=$-\omega_{max}$. Thereafter, when the transport robot 101 faces the direction orthogonal to the X axis ($\theta=-\pi/2$) as in FIG. 16, the transport robot 101 travels straight in the direction orthogonal to the X axis. Subsequently, the transport robot 101 starts to turn to turn back, at the position satisfying $y=R(1-\cos\theta)$ (inflection point).

Case where $y_0 = R(1-\cos\theta_0)$

This case corresponds to the example in FIG. 18. The transport robot 101 starts to turn to turn back, from the initial position at the angle velocity $\omega=+\omega_{max}$ and results in facing the target direction ($\theta=0$) exactly at the time point when the transport robot 101 reaches the X axis. In the example in FIG. 18, $y=R(1-\cos\theta)$ is always true. As described above, the example in FIG. 18 corresponds to the path after the inflection point in the example in FIG. 16 or FIG. 17. In the example in FIG. 18, the path to return to the target line is constituted of one turning path.

Case where $y_0 < R(1-\cos\theta_0)$

This case corresponds to the example in FIG. 19. Even though the transport robot 101 starts to turn back from the initial position at the angle velocity $\omega=+\omega_{max}$, the transport robot 101 cannot face right beside (0=0) on the X axis. Hence, overshoot always occurs. However, by the transport robot 101 thereafter continuing to turn in the same direction at the angle velocity $\omega=+\omega_{max}$, the transport robot 101 can face right beside ($\theta=0$) in the fourth quadrant. Thereafter, by the transport robot 101 continuing to travel similarly to the case where the initial angle $\theta_0=0$, the transport robot 101 can return to the target travel line (X axis). In the example in FIG. 19, the path to return to the target line is constituted of a combination of two turning paths having different angle velocities (turning directions).

In this way, in the present example embodiment, it is possible to switch between a turning path and a straight movement path by using $\theta=\pi/2$ and $y=R(1-\cos\theta)$ as thresholds.

As described above, in the present example embodiment, by performing control according to the initial position and the initial angle of the transport robot, the shortest path to return to a target travel line is enabled.

2.2. Operation Example

Next, a description will be given of an operation example in which the control apparatus 102 controls the transport robot 101 to return to the target travel line as described above.

Figure 20:
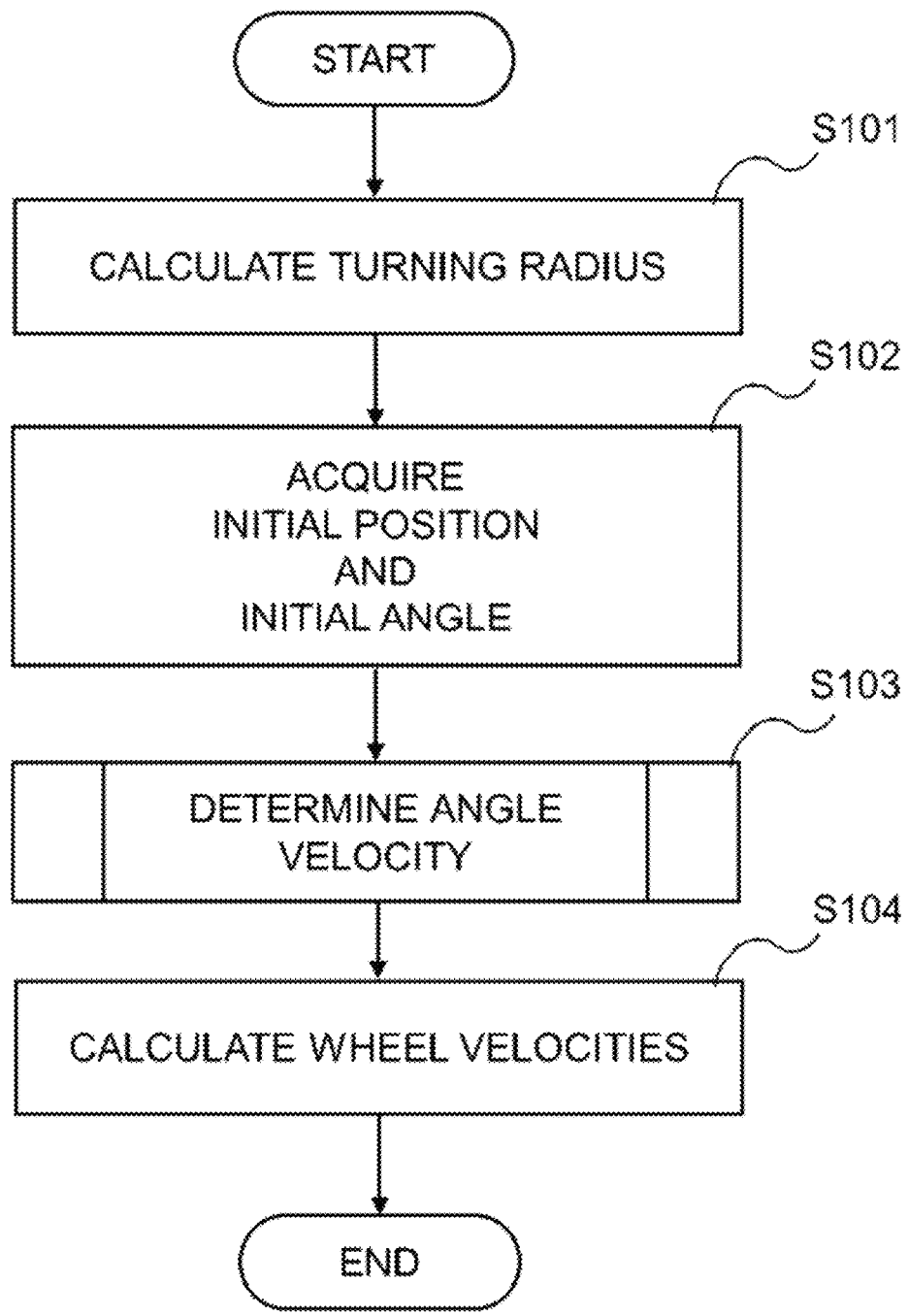
FIG. 20 is a flowchart illustrating an example of operation of a control apparatus according to the first example embodiment.

FIG. 20 is a flowchart illustrating an example of the operation of the control apparatus according to the first example embodiment. The steps in the flowchart can be performed by the robot control section 503 of the control apparatus 102.

First, in S101, the control apparatus 102 calculates the turning radius R of the transport robot 101. The turning radius R can be calculated by using the center-of-gravity velocity V and the maximum angle velocity $\omega_{max}$ set in advance, as expressed in Expression (9) below.

[Math. 9]

$$R = \frac{V}{\omega_{max}} \quad (9)$$

Subsequently, in S102, the control apparatus 102 acquires the initial position ($x_0$, $y_0$) of the transport robot 101 and the angle $\theta_0$ between the moving direction of the transport robot 101 and the target travel path.

Subsequently, in S103, the control apparatus 102 determines the angle velocity co of the transport robot 101, based on the maximum angle velocity $\omega_{max}$, the calculated turning radius R, and the initial position ($x_0$, $y_0$) and the initial angle $\theta_0$ thus acquired. Details of angle velocity determination processing will be described later.

Subsequently, in S104, the control apparatus 102 uses the determined angle velocity co to calculate the right and left wheel velocities $v_r$ and $v_l$ as expressed in Expressions (7) and (8) described above.

The control apparatus 102 transmits control information for controlling the transport robot 101, based on the right and left wheel velocities $v_r$ and $v_l$ calculated in S104.

Figure 21:
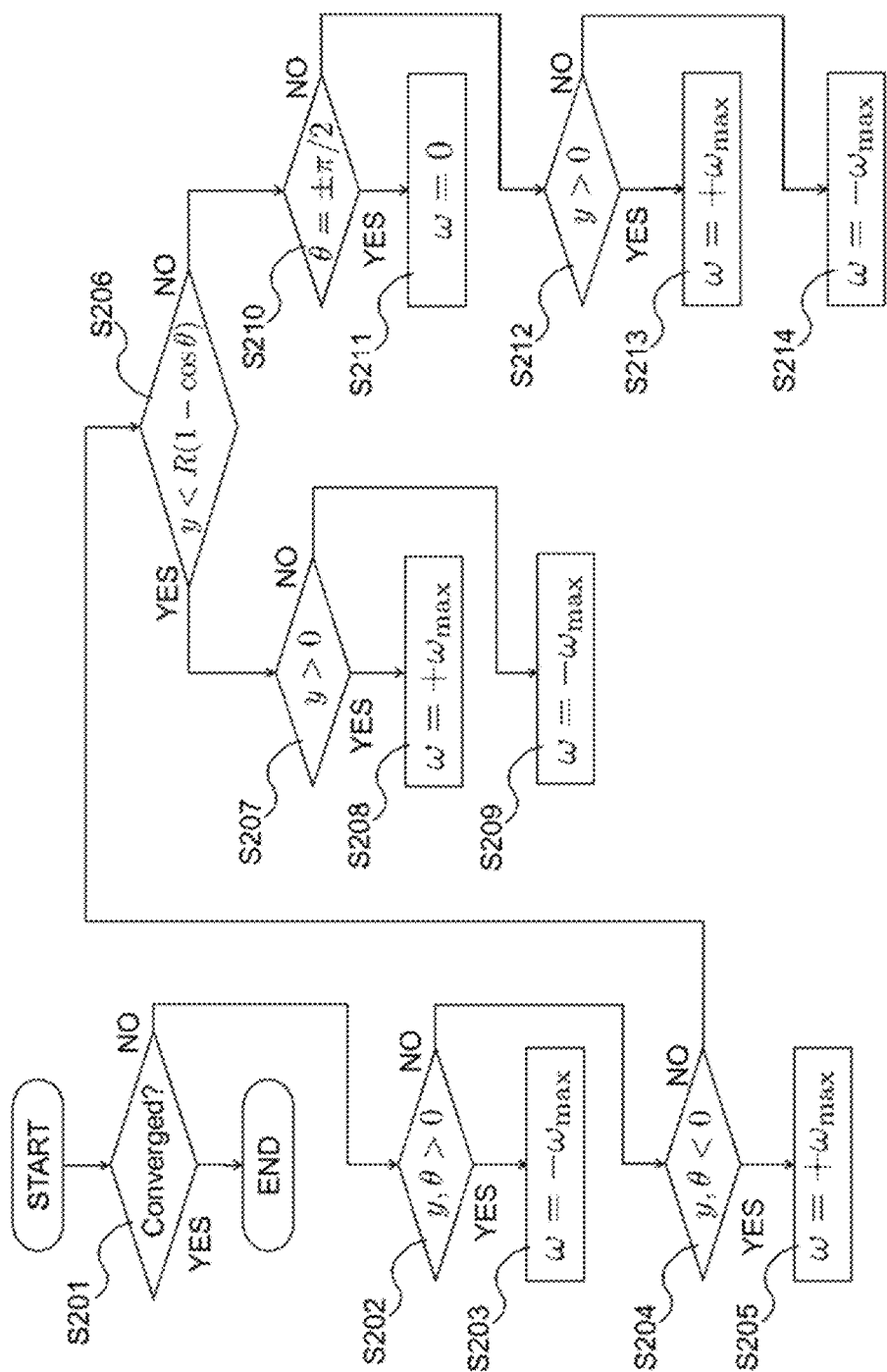
FIG. 21 is a flowchart of an angle velocity determination processing according to the first example embodiment.

Here, the angle velocity determination processing in S103 described above will be described in detail with reference to FIG. 21. The control apparatus 102 determines the angle velocity $\omega$ of the transport robot 101 so that the transport robot 101 can return to the target travel line by using a path of the shortest distance, based on the turning radius R, the initial position ($x_0$, $y_0$), and the initial angle $\theta_0$ of the transport robot 101. The angle velocity $\omega$ is limited by the maximum angle velocity $\omega_{max}$ set in advance and is determined from among $-\omega_{max}$, 0, $\omega_{max}$ (i.e., ternary control).

First, in S201, the control apparatus 102 determines whether the transport robot 101 is on the target travel line, based on the initial position and the initial angle of the transport robot 101. In other words, the control apparatus 102 determines whether the position of the transport robot 101 is converged on the X axis. When the position is converged on the X axis, the processing is terminated. In contrast, when the position is not converged on the X axis, the processing advances to S202.

In S202, the control apparatus 102 determines whether the Y coordinate of the initial position and the initial angle $\theta$ are larger than 0. When the Y coordinate and the initial angle $\theta$ are larger than 0, the processing advances to S203, and the control apparatus 102 determines the angle velocity $\omega$ to be $-\omega_{max}$ ($\omega=-\omega_{max}$). This corresponds, for example, to the example in FIG. 15. In contrast, when the Y coordinate and the initial angle $\theta$ are not larger than 0, the processing advances to S204.

In S204, the control apparatus 102 determines whether the Y coordinate of the initial position and the initial angle $\theta$ are smaller than 0. When the Y coordinate and the initial angle $\theta$ are smaller than 0, the processing advances to S205, and the control apparatus 102 determines the angle velocity $\omega$ to be $+\omega_{max}$ ($\omega=+\omega_{max}$). This corresponds, for example, to a path symmetric to that of the example in FIG. 15 with respect to the X axis. In contrast, when the Y coordinate and the initial angle $\theta$ are not smaller than 0, the processing advances to S206.

In S206, the control apparatus 102 determines whether the Y coordinate satisfies the relationship expressed by Expression (10) below.

[Math. 10]

$$y < R(1-\cos\theta) \quad (10)$$

When Expression (10) above is satisfied, the processing advances to S207 to determine whether the Y coordinate is larger than 0. When the Y coordinate is larger than 0, the processing advances to S208, and the control apparatus 102 determines the angle velocity $\omega$ to be $+\omega_{max}$ ($\omega=+\omega_{max}$). This corresponds, for example, to the example in FIG. 19. Otherwise, in contrast, the processing advances to S209, and the control apparatus 102 sets the angle velocity $\omega$ to be $-\omega_{max}$ ($\omega = -\omega_{max}$). This corresponds, for example, to a path symmetric to that of the example in FIG. 19 with respect to the X axis.

Return to S206, when the Y coordinate does not satisfy Expression (10) above, the processing advances to S210 to determine whether the initial angle θ is $+\pi/2$ ($\theta = +\pi/2$). When the initial position θ is $+\pi/2$, the processing advances to S211, and the control apparatus 102 determines the angle velocity ω to be 0 (ω=0). In contrast, when the initial position θ is not $+\pi/2$, the processing advances to S212.

In S212, the control apparatus 102 determines whether the Y coordinate is larger than 0. When the Y coordinate is larger than 0, the processing advances to S213, and the control apparatus 102 determines the angle velocity ω to be $+\omega_{max}$ ($\omega = +\omega_{max}$). This corresponds, for example, to the examples in FIG. 16 to FIG. 18. In contrast, when the Y coordinate is not larger than 0, the processing advances to S214, and the control apparatus 102 determines the angle velocity ω to be $-\omega_{max}$ ($\omega = -\omega_{max}$). This corresponds, for example, to a path symmetric to those of the examples in FIG. 16 to FIG. 18 with respect to the X axis.

Next, with reference to FIG. 22 to FIG. 29, a description will be given of examples of a control result when the control apparatus 102 determines the angle velocity co as described above.

Figure 22:
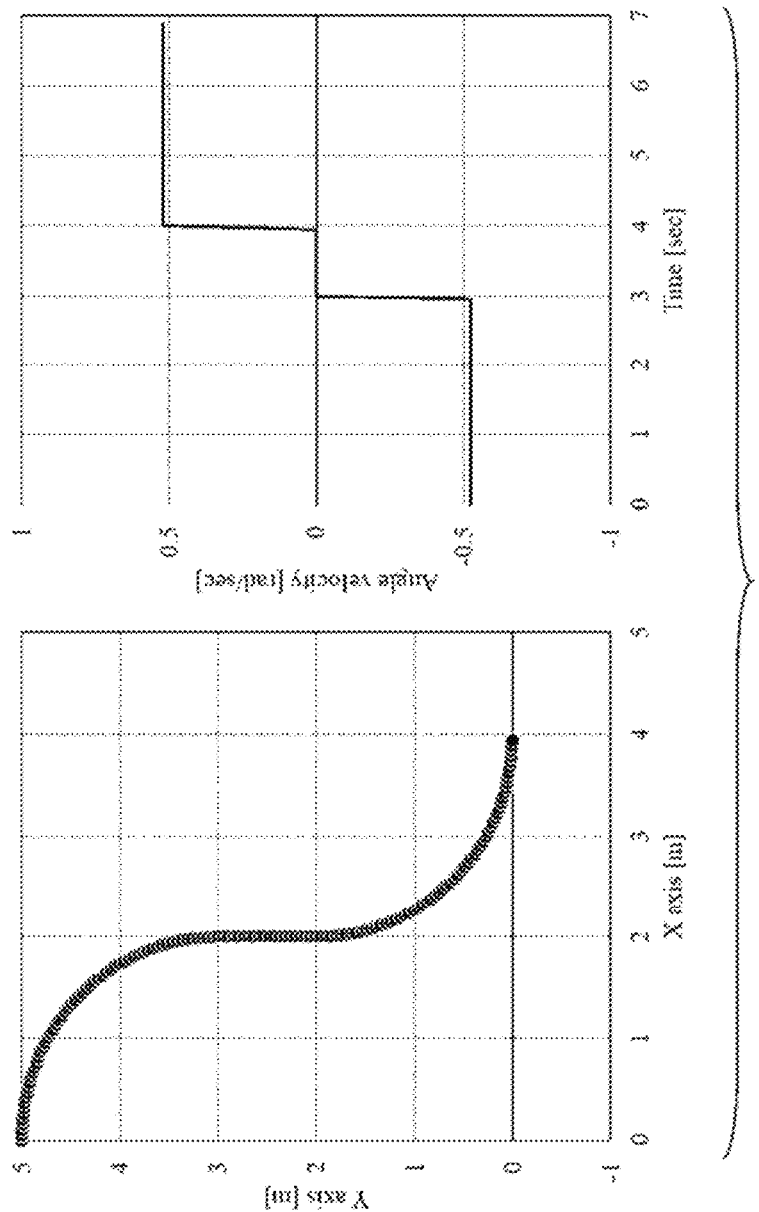
FIG. 22 is a diagram illustrating an example of a control result according to the first example embodiment.

FIG. 22 illustrates an example of a control result corresponding to the example in FIG. 13. As illustrated in the graph on the right side, the angle velocity ω starts with −0.5 [rad/sec], reaches 0 [rad/sec] in the straight movement zone, and then reaches +0.5 [rad/sec].

Figure 23:
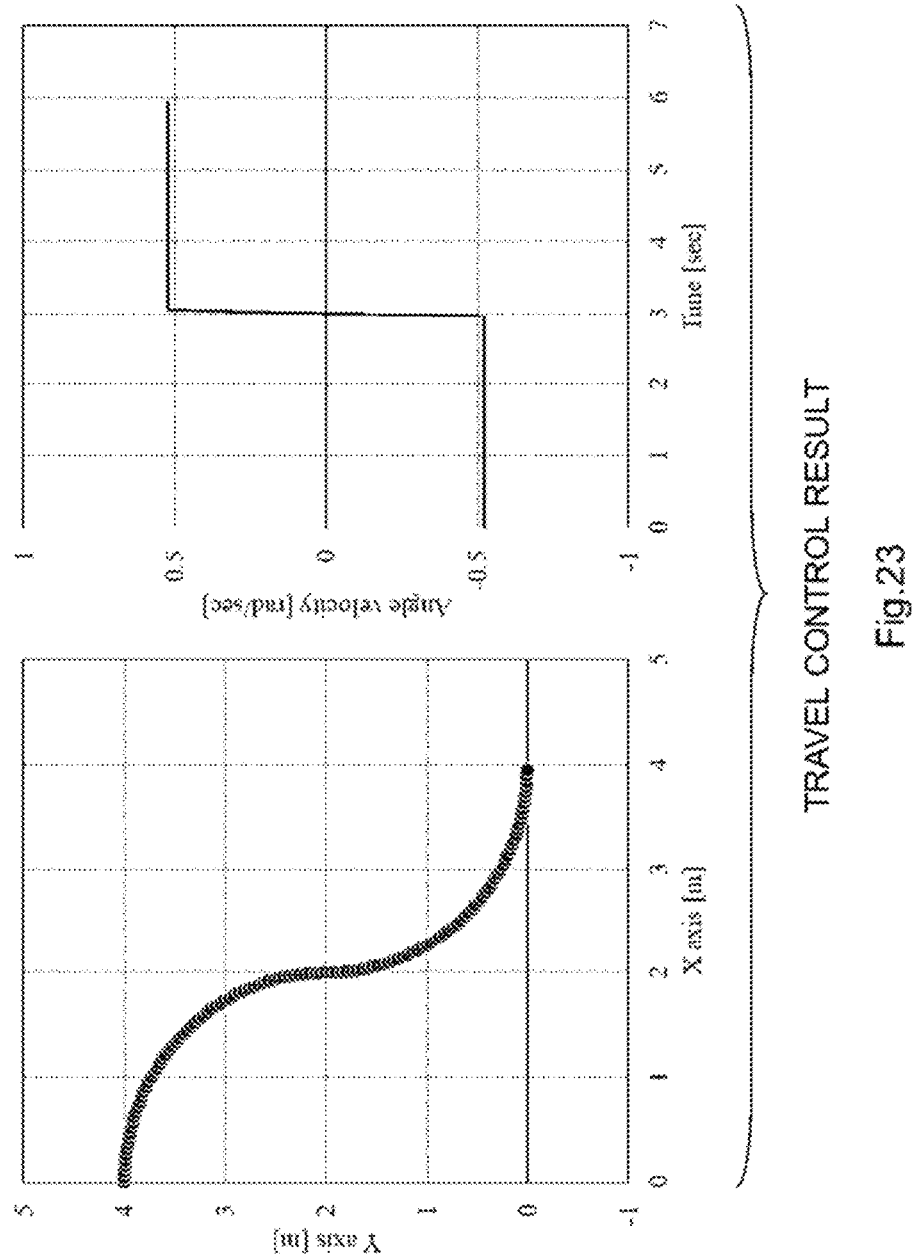
FIG. 23 is a diagram illustrating an example of a control result according to the first example embodiment.

FIG. 23 illustrates an example of a result of control of a path in which the transport robot 101 starts to turn back at a stage of facing the direction orthogonal to the X axis. In other words, FIG. 23 illustrates an example of a case with no straight movement zone. As illustrated in the graph on the right side, the angle velocity ω starts with −0.5 [rad/sec] and reaches +0.5 [rad/sec] at the stage where the transport robot 101 faces the direction orthogonal to the X axis.

Figure 24:
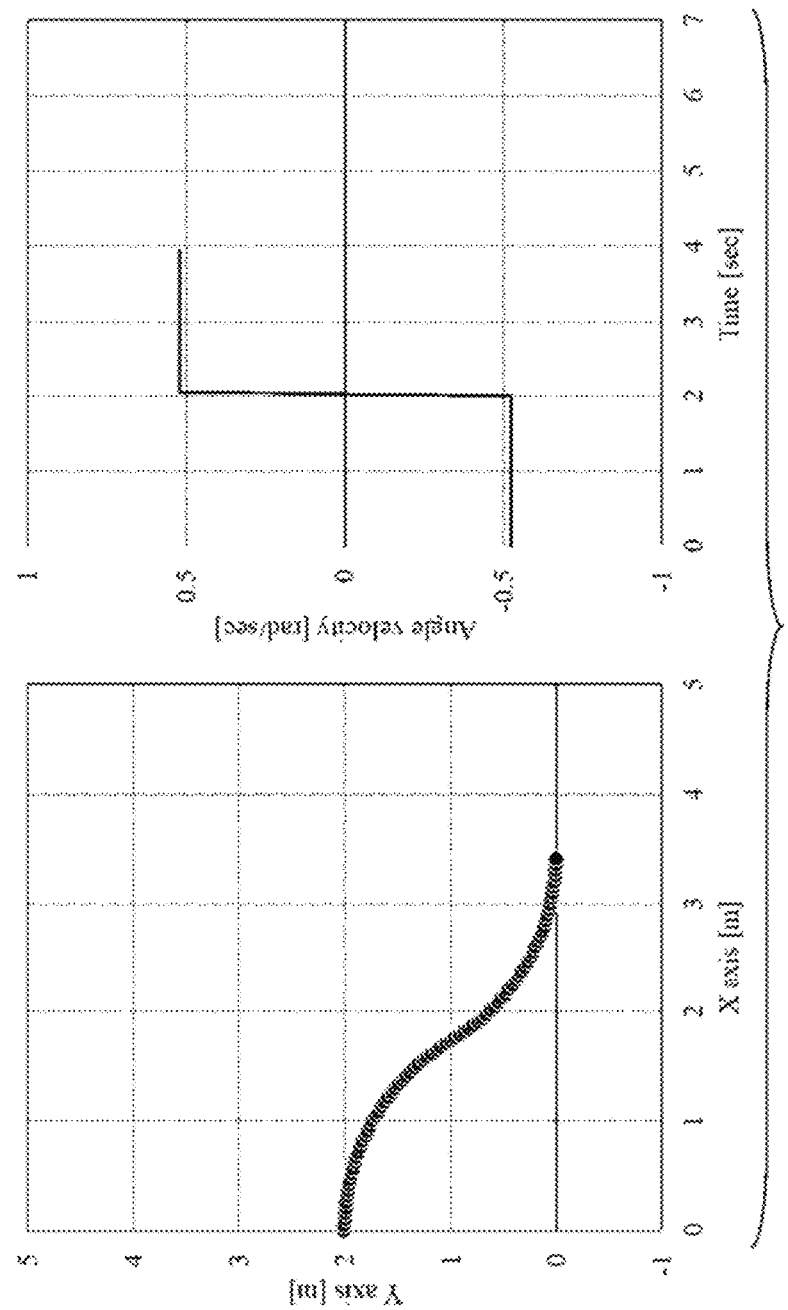
FIG. 24 is a diagram illustrating an example of a control result according to the first example embodiment.

FIG. 24 illustrates an example of a control result corresponding to the example in FIG. 14. As illustrated in the graph on the right side, the angle velocity ω starts with −0.5 [rad/sec] and reaches +0.5 [rad/sec] at the position of turning-back.

Figure 25:
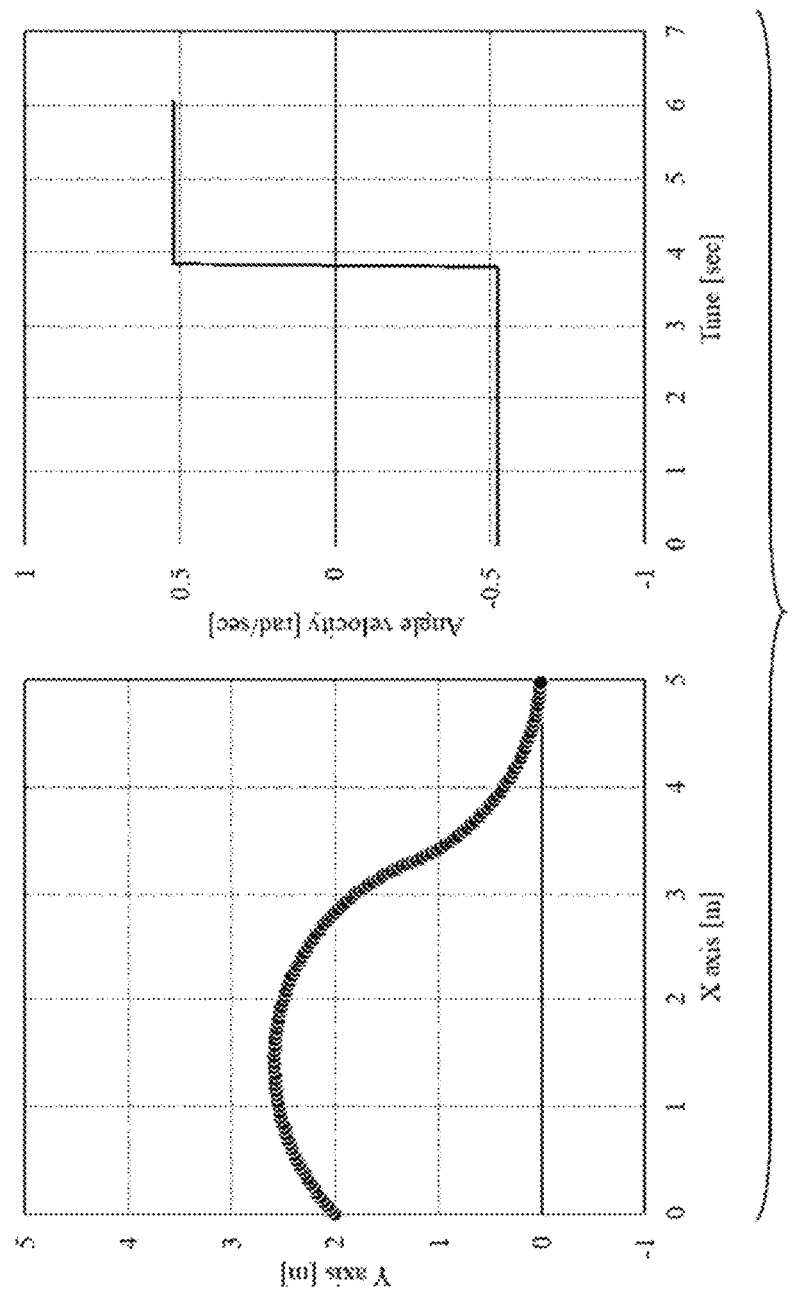
FIG. 25 is a diagram illustrating an example of a control result according to the first example embodiment.

FIG. 25 illustrates an example of a control result corresponding to the example in FIG. 15. As illustrated in the graph on the right side, the angle velocity ω starts with −0.5 [rad/sec] and, after the transport robot 101 faces right beside (θ=0), is controlled in a similar manner as that in FIG. 24.

Figure 26:
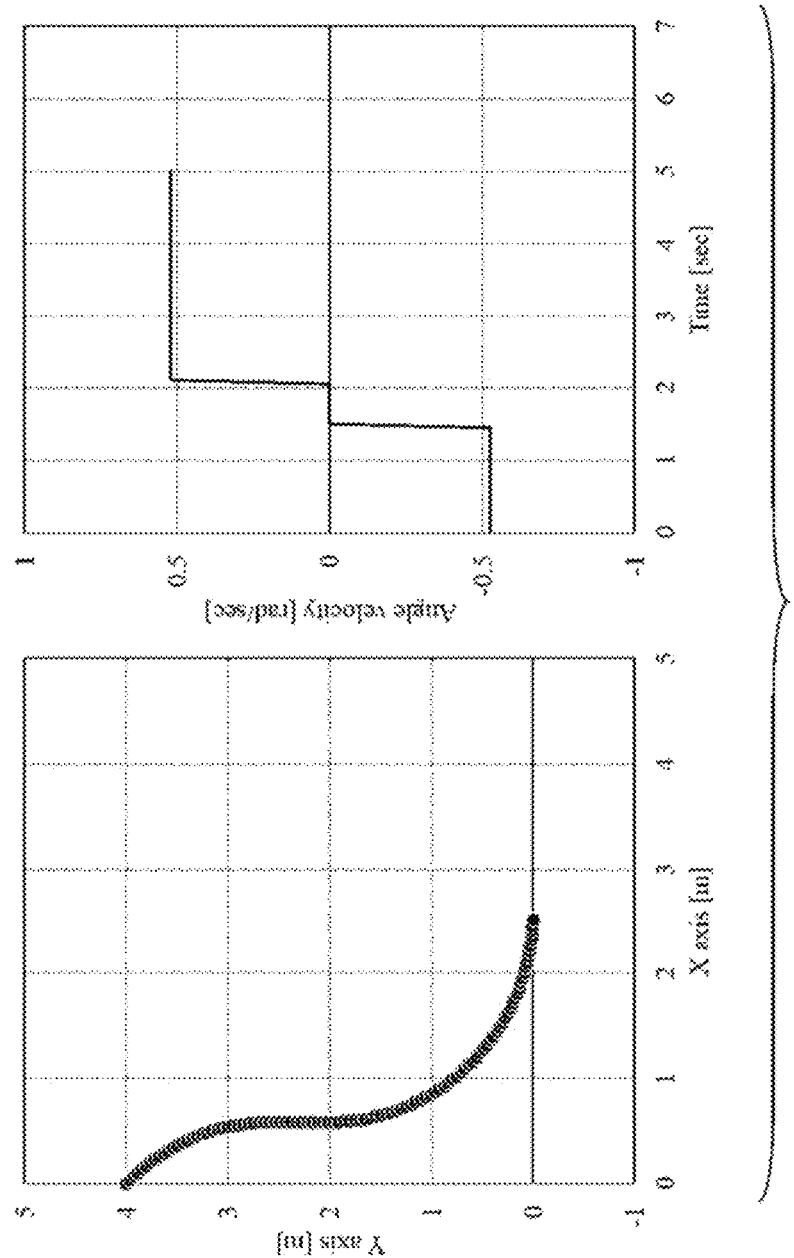
FIG. 26 is a diagram illustrating an example of a control result according to the first example embodiment.

FIG. 26 illustrates an example of a control result corresponding to the example in FIG. 16. As illustrated in the graph on the right side, the angle velocity ω starts with −0.5 [rad/sec], reaches 0 [rad/sec] in the straight movement zone, and then reaches +0.5 [rad/sec].

Figure 27:
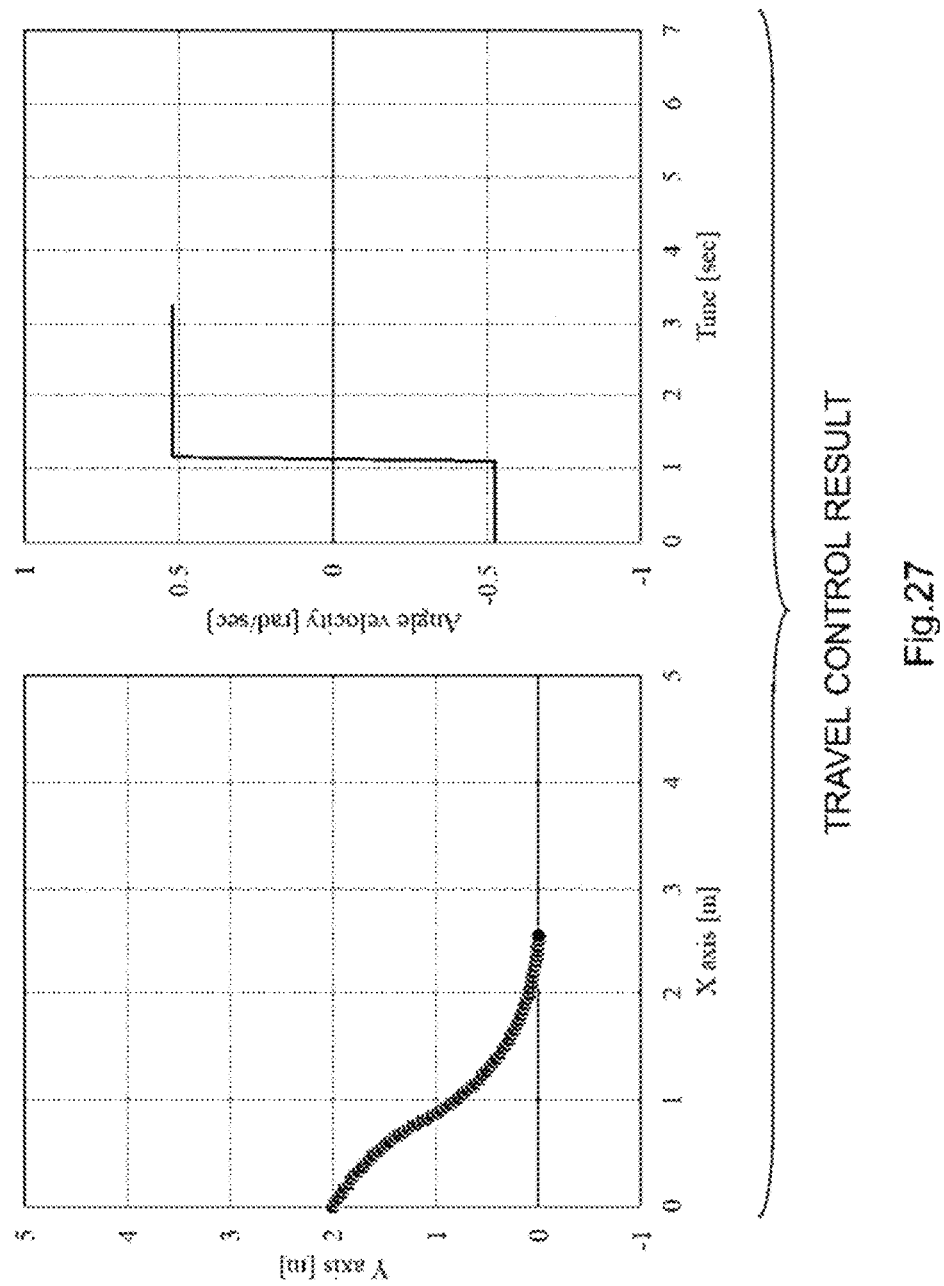
FIG. 27 is a diagram illustrating an example of a control result according to the first example embodiment.

FIG. 27 illustrates an example of a control result corresponding to the example in FIG. 17. As illustrated in the graph on the right side, the angle velocity ω starts with −0.5 [rad/sec] and reaches +0.5 [rad/sec] at the position of turning-back.

Figure 28:
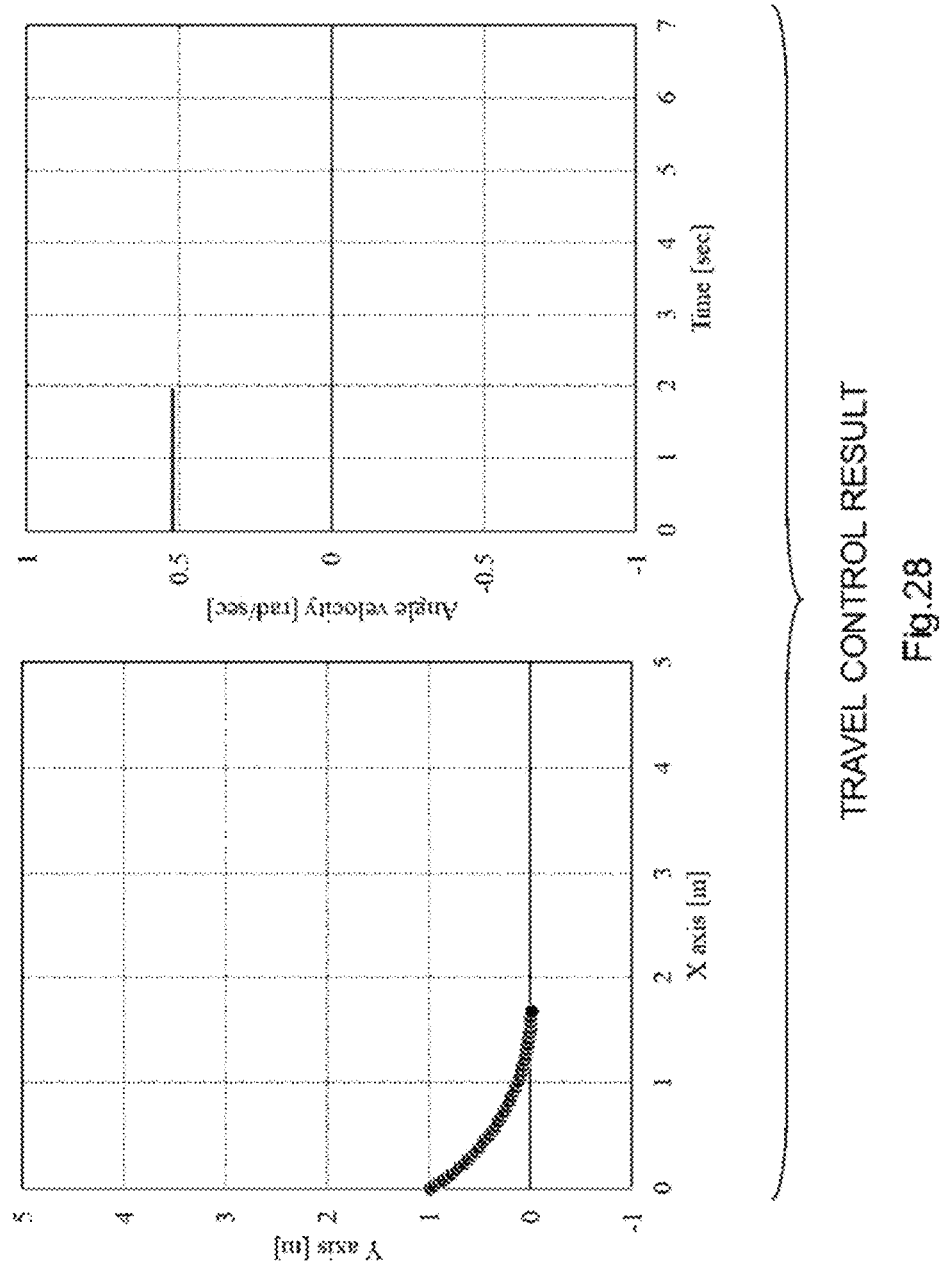
FIG. 28 is a diagram illustrating an example of a control result according to the first example embodiment.

FIG. 28 illustrates an example of a control result corresponding to the example in FIG. 18. As illustrated in the graph on the right side, the angle velocity ω starts with +0.5 [rad/sec] and continues turning at the same angle velocity to the target travel line.

Figure 29:
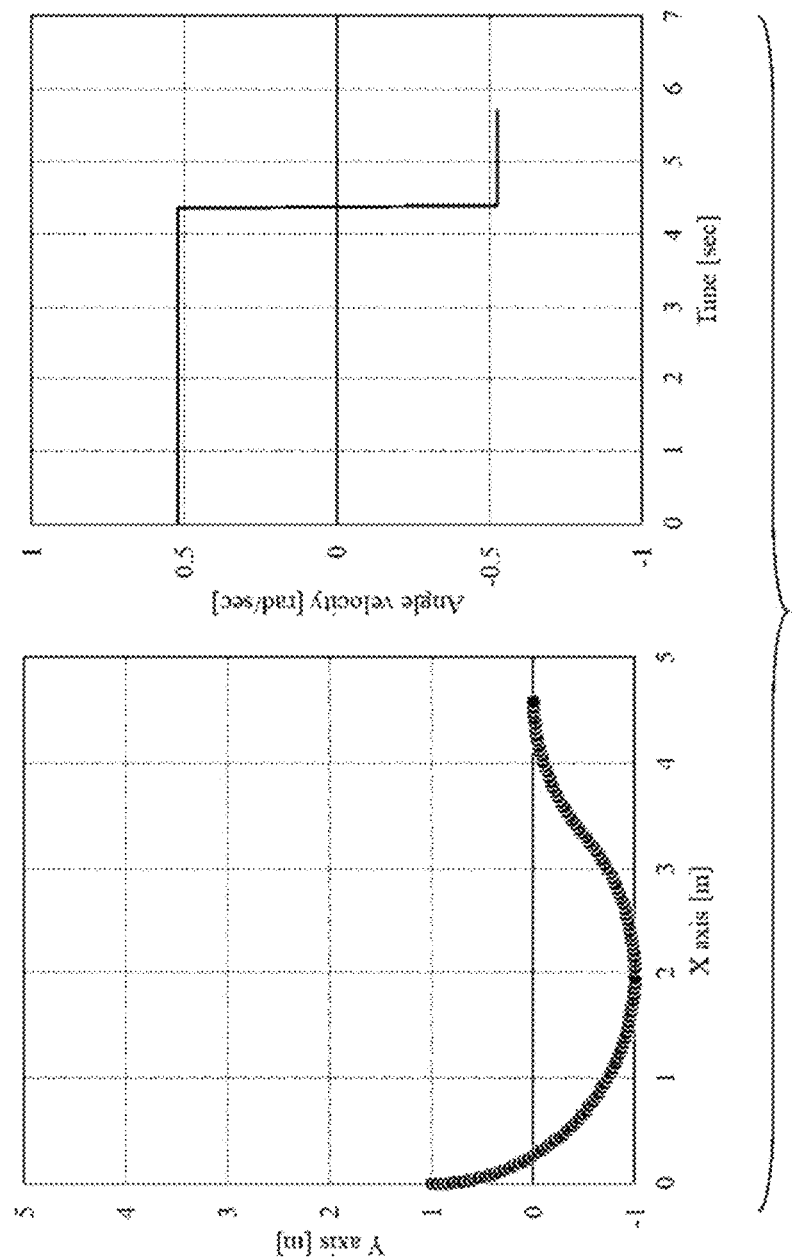
FIG. 29 is a diagram illustrating an example of a control result according to the first example embodiment.

FIG. 29 illustrates an example of a control result corresponding to the example in FIG. 19. As illustrated in the graph on the right side, the angle velocity ω starts with +0.5 [rad/sec], faces right beside (θ=0) after passing the X axis (overshooting), continues turning at the same angle velocity to the position of turning-back, and thereafter reaches −0.5 [rad/sec].

As described above, in the present example embodiment, the control apparatus 102 can determine the angle velocity ω of the transport robot 101 so that the transport robot 101 travels on a path (path of the shortest distance) appropriate for returning to the target travel line under certain conditions, based on the turning radius R, the initial position ($x_0$, $y_0$), and the initial angle $\theta_0$ of the transport robot 101.

Figure 30:
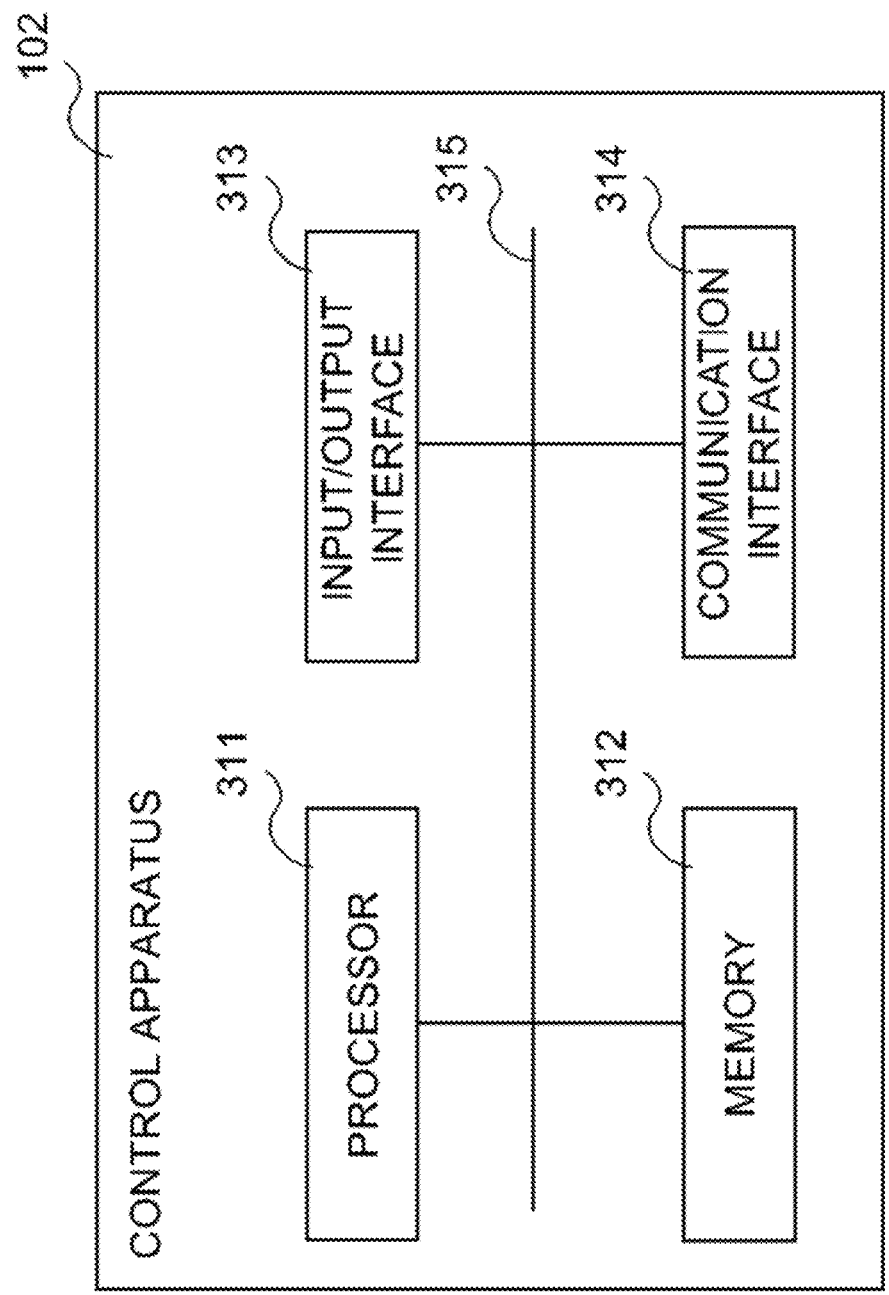
FIG. 30 is a diagram illustrating an example of a hardware configuration of the control apparatus according to the first example embodiment.

Next, hardware of each of apparatuses constituting the transport system will be described. FIG. 30 is a diagram illustrating an example of a hardware configuration of the control apparatus 102.

The control apparatus 102 can be configured with an information processing apparatus (so-called, a computer). For example, the control apparatus 102 includes a processor 311, a memory 312, an input/output interface 313, a communication interface 314, and the like. Constituent elements such as the processor 311 are connected to each other with an internal bus 315 or the like, and are configured to be capable of communicating with each other.

Note that the configuration illustrated in FIG. 30 is not to limit the hardware configuration of the control apparatus 102. The control apparatus 102 may include hardware not illustrated, or need not include the input/output interface 313 as necessary. The number of processors 311 or the like included in the control apparatus 102 is not to be limited to the example illustrated in FIG. 30, and for example, a plurality of processors 311 may be included in the control apparatus 102.

The processor 311 is, for example, a programmable device such as a central processing unit (CPU), a micro processing unit (MPU), and a digital signal processor (DSP). Alternatively, the processor 311 may be a device such as a field programmable gate array (FPGA) and an application specific integrated circuit (ASIC). The processor 311 executes various programs including an operating system (OS).

The memory 312 is a random access memory (RAM), a read only memory (ROM), a hard disk drive (HDD), a solid state drive (SSD), or the like. The memory 312 stores an OS program, an application program, and various pieces of data.

The input/output interface 313 is an interface of a display apparatus and an input apparatus (not illustrated). The display apparatus is, for example, a liquid crystal display or the like. The input apparatus is, for example, an apparatus that receives user operation, such as a keyboard and a mouse.

The communication interface 314 is a circuit, a module, or the like that performs communication with another apparatus. For example, the communication interface 314 includes a network interface card (NIC), a radio communication circuit, or the like.

The function of the control apparatus 102 is implemented by various processing modules. Each of the processing modules is, for example, implemented by the processor 311 executing a program stored in the memory 312. The program can be recorded on a computer readable storage medium. The storage medium can be a non-transitory storage medium, such as a semiconductor memory, a hard disk, a magnetic recording medium, and an optical recording medium. In other words, the present invention can also be implemented as a computer program product. The program can be updated through downloading via a network, or by using a storage medium storing a program. In addition, the processing module may be implemented by a semiconductor chip.

Note that each of the position information generation apparatus 103, the transport planning apparatus 104, and the like can be configured with an information processing apparatus similarly to the control apparatus 102, and there is no difference in basic hardware configuration between the apparatus and the control apparatus 102. Hence, a description of the basic hardware configuration is omitted.

3. SECOND EXAMPLE EMBODIMENT

Next, a second example embodiment will be described in detail with reference to FIG. 31 and FIG. 32.

3.1. System Configuration

Figure 31:
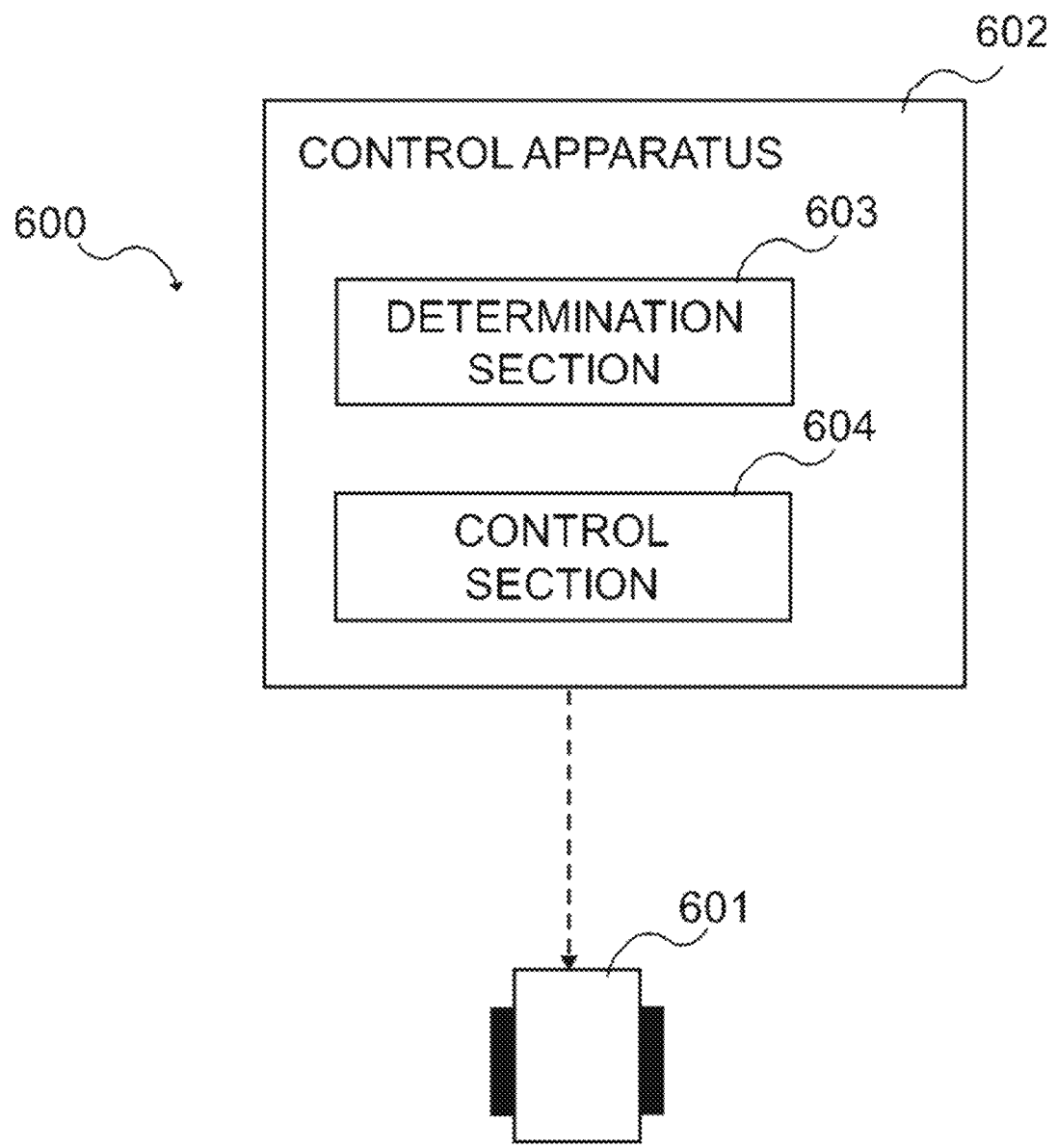
FIG. 31 is a diagram illustrating an example of a schematic configuration of a moving body control system according to a second example embodiment.

FIG. 31 is a diagram illustrating an example of a schematic configuration of a moving body control system according to the second example embodiment. A moving body control system 600 according to the present example embodiment includes a moving body 601 and a control apparatus 602 configured to control the moving body 601 to follow a target line. The control apparatus 602 includes a determination section 603 and a control section 604.

The determination section 603 determines a path to return to the target line, the path including the turning path of the turning radius of the moving body 601, based on the turning radius of the moving body 601, the distance between the moving body 601 and the target line, and the angle between the moving direction of the moving body 601 and the target line. The control section 604 controls the moving body 601 so that the moving body 601 travels on the path.

The processing section is implemented, for example, with a central processing unit (CPU) of a computer configured to operate in accordance with a program or a communication interface of the computer. For example, the CPU reads a program from a program recording medium (a non-transitory computer readable recording medium), such as a program storage apparatus of the computer, and uses the communication interface as necessary to thereby be able to operate as each of the processing sections of each of the apparatuses described above in accordance with the program.

3.2. Operation Example

Figure 32:
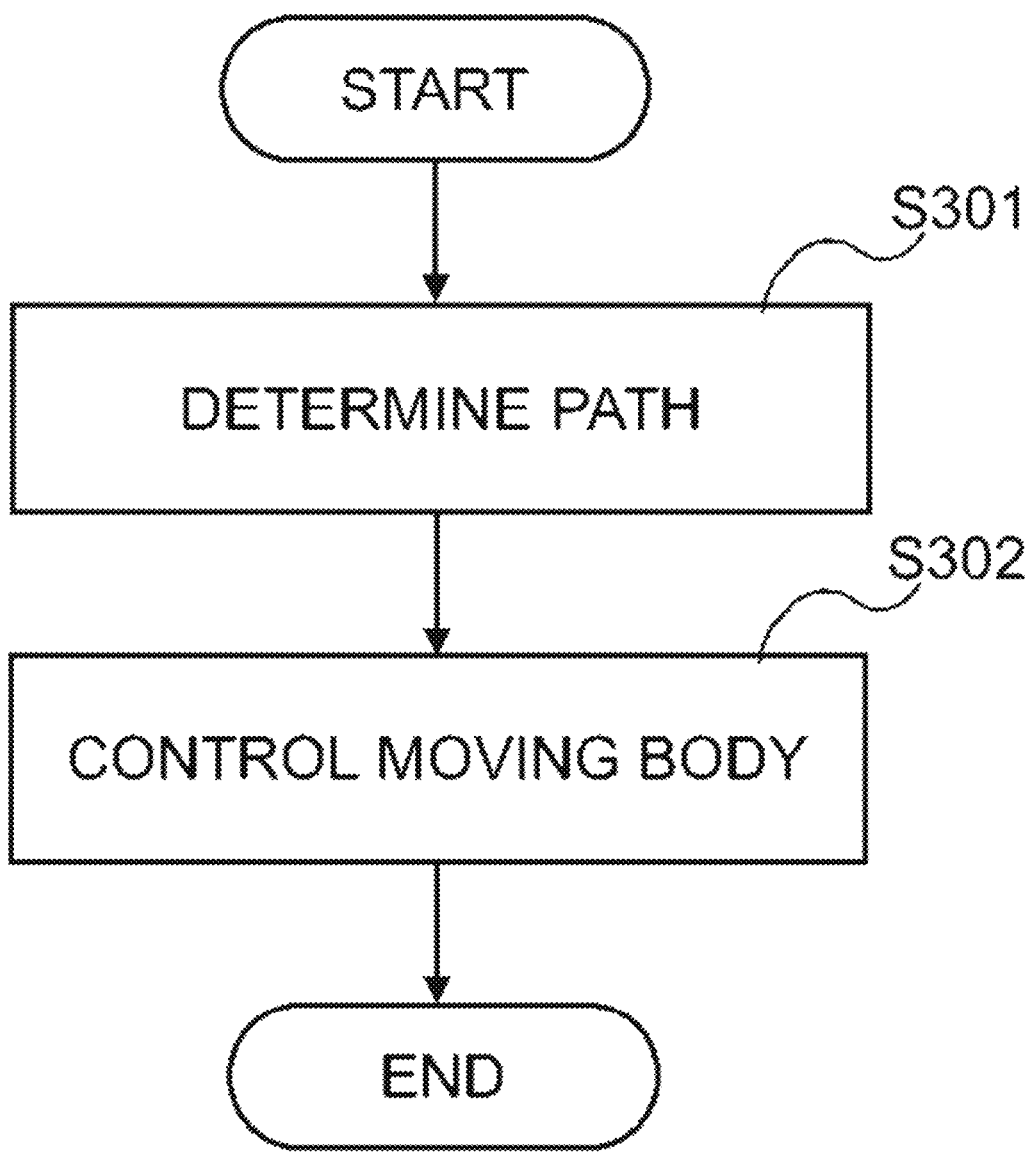
FIG. 32 is a flowchart illustrating an example of operation of a control apparatus according to the second example embodiment.

FIG. 32 is a flowchart illustrating an example of operation of the control apparatus according to the second example embodiment.

First, in S301, the control apparatus 602 (determination section 603) determines a path to return to the target line, the path including the turning path of the turning radius of the moving body 601, based on the turning radius of the moving body 601, the distance between the moving body 601 and the target line, and the angle between the moving direction of the moving body 601 and the target line.

Next, in S302, the control apparatus 602 (control section 604) controls the moving body 601 so that the moving body 601 travels on the path.

Relationship with First Example Embodiment

As an example, the moving body control system 600 according to the second example embodiment is a transport system 100 according to the first example embodiment. In this case, the description of the first example embodiment is also applicable to the second example embodiment.

Note that the second example embodiment is not limited to this example.

Note that the configuration, the operation, and the like of the transport system described in each of the example embodiments are merely examples, and are not to limit the configuration and the like of the system. For example, the functions of the position information generation apparatus 103 may be implemented by the control apparatus 102. For example, the position information generation apparatus 103 may perform processing related to determination of a position of an article, and the control apparatus 102 may determine the kind of the article.

Alternatively, the position information generation apparatus 103 may be installed in the field, and the control apparatus 102 may be implemented in a server in a network. In other words, the transport system according to the disclosure of this application may be implemented as an edge cloud system.

In the example embodiments, a description has been given of a case of using a camera (for example, a depth camera) capable of detecting the height of an article. However, a normal camera may be used when the height of an article need not be detected. Alternatively, an infrared sensor or a distance sensor may be used as a sensor for detecting a position of an article.

In the flowcharts used in the description above, a plurality of processes (processing) are described in order; however, the order of execution of the processes executed in each of the example embodiments is not limited to the described order. In each example embodiment, the illustrated order of processes can be changed as far as there is no problem with regard to processing contents, such as a change in which respective processes are executed in parallel, for example.

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

Part of or all the example embodiments may be described as in the supplementary notes below but is not limited thereto.

Supplementary Note 1

A moving body control system including:
a moving body; and
a control apparatus configured to control the moving body to follow a target line, wherein,
the control apparatus is configured to:
    determine a path to return to the target line, including a turning path by a turning radius of the moving body, based on the turning radius of the moving body, a distance between the moving body and the target line, and an angle between a moving direction of the moving body and the target line; and
    control the moving body to travel on the path.

Supplementary Note 2

The moving body control system according to supplementary note 1, wherein the path further includes a straight movement path to a direction orthogonal to the target line.

Supplementary Note 3

The moving body control system according to supplementary note 2, wherein the straight movement path is included in the path when y>2R, where the distance is y and the turning radius is R.

Supplementary Note 4

The moving body control system according to supplementary note 2 or 3, wherein
 a center-of-gravity velocity of the moving body is constant, and
 the control apparatus is configured to switch between the turning path and the straight movement path by using $\theta=\pi/2$ and $y=R(1-\cos\theta)$ as thresholds, where the angle is $\theta$, the distance is y, and the turning radius is R.

Supplementary Note 5

The moving body control system according to any one of supplementary notes 1 to 4, wherein the control apparatus is configured to determine an angle velocity of the moving body on the turning path, based on the turning radius, the distance, and the angle.

Supplementary Note 6

The moving body control system according to supplementary note 5, wherein the angle velocity is limited within a certain range.

Supplementary Note 7

The moving body control system according to any one of supplementary notes 1 to 6, wherein the path includes two turning paths for the moving body to turn at two respective angle velocities different from each other in terms of positive and negative signs.

Supplementary Note 8

The moving body control system according to any one of supplementary notes 1 to 7, wherein the moving body is a transport robot configured to transport goods.

Supplementary Note 9

A control apparatus including:
 a determination means configured to determine a path to return to a target line, including a turning path by a turning radius of a moving body controlled to follow the target line, based on the turning radius of the moving body, a distance between the moving body and the target line, and an angle between a moving direction of the moving body and the target line; and
 a control means configured to control the moving body to travel on the path.

Supplementary Note 10

The control apparatus according to supplementary note 9, wherein the path further includes a straight movement path to a direction orthogonal to the target line.

Supplementary Note 11

The control apparatus according to supplementary note 10, wherein the straight movement path is included in the path when y>2R, where the distance is y and the turning radius is R.

Supplementary Note 12

The control apparatus according to supplementary note 10 or 11, wherein
 a center-of-gravity velocity of the moving body is constant, and
 the determination means is configured to switch between the turning path and the straight movement path by using $\theta=\pi/2$ and $y=R(1-\cos\theta)$ as thresholds, where the angle is $\theta$, the distance is y, and the turning radius is R.

Supplementary Note 13

The control apparatus according to any one of supplementary notes 9 to 12, wherein the determination means is configured to determine an angle velocity of the moving body on the turning path, based on the turning radius, the distance, and the angle.

Supplementary Note 14

The control apparatus according to supplementary note 13, wherein the angle velocity is limited within a certain range.

Supplementary Note 15

The control apparatus according to any one of supplementary notes 9 to 14, wherein the path includes two turning paths for the moving body to turn at two respective angle velocities different from each other in terms of positive and negative signs.

Supplementary Note 16

A moving body control method including:
 a determination step of determining a path to return to a target line, including a turning path by a turning radius of a moving body controlled to follow the target line, based on the turning radius of the moving body, a distance between the moving body and the target line, and an angle between a moving direction of the moving body and the target line; and
 a control step of controlling the moving body to travel on the path.

Supplementary Note 17

The moving body control method according to supplementary note 16, wherein the path includes a straight movement path to a direction orthogonal to the target line.

Supplementary Note 18

The moving body control method according to supplementary note 17, wherein the straight movement path is included in the path when y>2R, where the distance is y and the turning radius is R.

Supplementary Note 19

The moving body control method according to supplementary note 17 or 18, wherein a center-of-gravity velocity of the moving body is constant, and the determination step includes switching between the turning path and the straight movement path by using $\theta=\pi/2$ and $y=R(1-\cos\theta)$ as thresholds, where the angle is $\theta$, the distance is y, and the turning radius is R.

Supplementary Note 20

The moving body control method according to any one of supplementary notes 16 to 19, wherein the determination step includes determining an angle velocity of the moving body on the turning path, based on the turning radius, the distance, and the angle.

Supplementary Note 21

The moving body control method according to supplementary note 20, wherein the angle velocity is limited within a certain range.

Supplementary Note 22

The moving body control method according to any one of supplementary notes 16 to 21, wherein the path includes two turning paths for the moving body to turn at two respective angle velocities different from each other in terms of positive and negative signs.

This application claims priority based on JP 2020-142065 filed on Aug. 25, 2020, the entire disclosure of which is incorporated herein.

INDUSTRIAL APPLICABILITY

Although the industrial applicability of the present invention is apparent from the description above, the present invention can be preferably applied to goods transport in a factory, distribution warehouse, or the like.

REFERENCE SIGNS LIST

100 Transport System
101 Transport Robot
102 Control Apparatus
103 Position Information Generation Apparatus

What is claimed is:

1. A moving body control system comprising:
a moving body; and
a control apparatus configured to control the moving body to follow a target line, wherein,
the control apparatus including a memory storing instructions, and one or more processors, wherein,
the one or more processors are configured to execute the instructions to:
determine a path to return to the target line, including a turning path by a turning radius of the moving body, based on the turning radius of the moving body, a distance between the moving body and the target line, and an angle between a moving direction of the moving body and the target line; and
control the moving body to travel on the path,
wherein the path further includes a straight movement path to a direction orthogonal to the target line and a length of the straight movement path is at least twice the turning radius.

2. The moving body control system according to claim 1, wherein
a center-of-gravity velocity of the moving body is constant, and
the one or more processors are configured to execute the instructions to switch between the turning path and the straight movement path by using $\theta=\pi/2$ and $y=R(1-\cos\theta)$ as thresholds, where the angle is $\theta$, the distance is y, and the turning radius is R.

3. The moving body control system according to claim 1, wherein the control apparatus is configured to determine an angle velocity of the moving body on the turning path, based on the turning radius, the distance, and the angle.

4. The moving body control system according to claim 3, wherein the angle velocity is limited within a predetermined range.

5. The moving body control system according to claim 1, wherein the path includes two turning paths for the moving body to turn at two respective angle velocities different from each other in terms of positive and negative signs.

6. The moving body control system according to claim 1, wherein the moving body is a transport robot configured to transport goods.

7. A control apparatus comprising:
a memory storing instructions; and
one or more processors configured to execute the instructions to:
determine a path to return to a target line, including a turning path by a turning radius of a moving body controlled to follow the target line, based on the turning radius of the moving body, a distance between the moving body and the target line, and an angle between a moving direction of the moving body and the target line; and
control the moving body to travel on the path,
wherein the path further includes a straight movement path to a direction orthogonal to the target line and a length of the straight movement path is at least twice the turning radius.

8. The control apparatus according to claim 7, wherein
a center-of-gravity velocity of the moving body is constant, and
the one or more processors are configured to execute the instructions to switch between the turning path and the straight movement path by using $\theta=\pi/2$ and $y=R(1-\cos\theta)$ as thresholds, where the angle is 0, the distance is y, and the turning radius is R.

9. The control apparatus according to claim 7, wherein the one or more processors are configured to execute the instructions to determine an angle velocity of the moving body on the turning path, based on the turning radius, the distance, and the angle.

10. The control apparatus according to claim 9, wherein the angle velocity is limited within a predetermined range.

11. The control apparatus according to claim 7, wherein the path includes two turning paths for the moving body to turn at two respective angle velocities different from each other in terms of positive and negative signs.

12. A moving body control method comprising:
determining a path to return to a target line, including a turning path by a turning radius of a moving body controlled to follow the target line, based on the turning radius of the moving body, a distance between the moving body and the target line, and an angle between a moving direction of the moving body and the target line; and controlling the moving body to travel on the path,
wherein the path further includes a straight movement path to a direction orthogonal to the target line and a length of the straight movement path is at least twice the turning radius.

13. The moving body control method according to claim 12, wherein
a center-of-gravity velocity of the moving body is constant, and
the determining includes switching between the turning path and the straight movement path by using $\theta=\pi/2$ and $y=R(1-\cos\theta)$ as thresholds, where the angle is $\theta$, the distance is y, and the turning radius is R.

14. The moving body control method according to claim 12, wherein the determining includes determining an angle velocity of the moving body on the turning path, based on the turning radius, the distance, and the angle.

* * * * *